United States Patent
Davis et al.

(10) Patent No.: US 7,930,386 B2
(45) Date of Patent: Apr. 19, 2011

(54) NETWORK DISCOVERY AND DYNAMIC ADAPTATION OF INSUFFICIENT QOS RESOURCES

(75) Inventors: Brian Alan Davis, Medford, MA (US); Joseph Roy Stone, Plano, TX (US); Flemming Stig Andreasen, Marlboro, NJ (US); Michael Anthony Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 541 days.

(21) Appl. No.: 11/673,296

(22) Filed: Feb. 9, 2007

(65) Prior Publication Data

US 2008/0192763 A1    Aug. 14, 2008

(51) Int. Cl.
*G06F 15/16* (2006.01)
(52) U.S. Cl. .... 709/224; 709/207; 709/228; 370/395.42
(58) Field of Classification Search .................. 709/223, 709/224, 226–228, 207; 370/395.4–395.43
See application file for complete search history.

(56) References Cited

U.S. PATENT DOCUMENTS

| | | | |
|---|---|---|---|
| 6,445,679 B1 * | 9/2002 | Taniguchi et al. | 370/232 |
| 2002/0075806 A1 * | 6/2002 | Shalvi et al. | 370/235 |
| 2005/0159166 A1 * | 7/2005 | Jonsson et al. | 455/452.2 |
| 2007/0076599 A1 * | 4/2007 | Ayyagari et al. | 370/229 |
| 2007/0211631 A1 * | 9/2007 | Rahman et al. | 370/230 |
| 2008/0013544 A1 * | 1/2008 | Ginde et al. | 370/395.21 |

* cited by examiner

*Primary Examiner* — David Lazaro
(74) *Attorney, Agent, or Firm* — Schwegman, Lundberg & Woessner, P.A.

(57) ABSTRACT

In one embodiment, a method is illustrated as including receiving a data packet at a network device, and upshifting a Quality of Service (QoS) reservation, wherein the upshifting is based upon an observed increase type selected from the group consisting of an observed increase in network traffic, data packet size, and data packet frequency. In a further embodiment, a network device is illustrated as possessing a receiver to receive data packets, and an upshifter to upshift a Quality of Service (QoS) reservation, wherein the upshifter observes an increase type selected from the group consisting of an observed increase in network traffic, data packet size, and data packet frequency.

21 Claims, 17 Drawing Sheets

NETWORK DISCOVERY AND DYNAMIC ADAPTATION OF INSUFFICIENT QOS RESOURCES

FIELD

This application relates to adjusting Quality of Service (QoS) levels in a network.

BACKGROUND

QoS reservations can be provided in two fundamentally different ways: endpoint initiated and proxied. With endpoint initiated QoS, such as the Resource Reservation Protocol (RSVP), the endpoint simply informs the network of the desired QoS at any given point in time. With proxied QoS (such as PacketCable Multimedia (PCMM)) however, QoS reservations are installed on behalf of the endpoint by an entity in the network which we will refer to as a QoS Application Function (AF).

BRIEF DESCRIPTION OF DRAWINGS

The present invention is illustrated by way of example and not limitation in the figures of the accompanying drawings, in which like references indicate similar elements and in which.

DESCRIPTION OF EXAMPLE EMBODIMENTS

Figure 1:
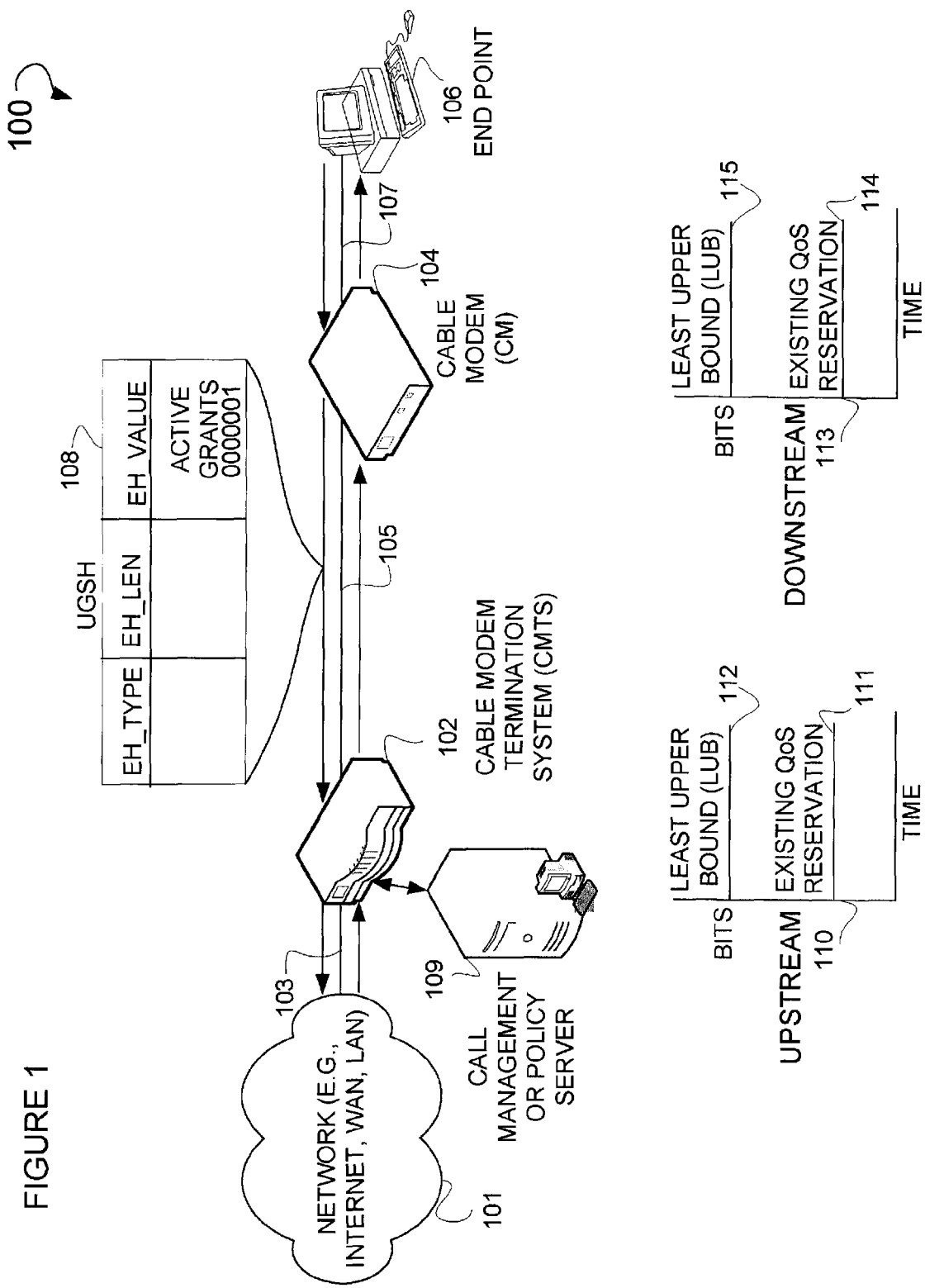
FIG. 1 is a diagram of an example system illustrating a system in steady state wherein resource reservations are made.

In the following description, for purposes of explanation, numerous specific details are set forth in order to provide a thorough understanding of an embodiment of the present invention. It may be evident, however, to one skilled in the art that the present invention will be practiced without these specific details.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Overview

In one example embodiment, a method is illustrated as including receiving a data packet at a network device, and upshifting a Quality of Service (QoS) reservation, wherein the upshifting is based upon an observed increase type selected from the group consisting of an observed increase in network traffic, data packet size, and data packet frequency. In a further embodiment, a network device is illustrated as possessing a receiver to receive data packets, and an upshifter to upshift a Quality of Service (QoS) reservation, wherein the upshifter observes an increase type selected from the group consisting of an observed increase in network traffic, data packet size, and data packet frequency.

Example Case: Steady State & Upstream Cases

In some embodiments, routers and other network devices (e.g., a Cable Modem (CM)), or combinations thereof, or other devices capable of deep packet inspection are used to discover when current QoS levels are insufficient for a particular flow (e.g., a media or data flow), and to adjust the QoS to a previously authorized Least Upper Bound (LUB) for the flow. This adjustment may occur without external triggers from the session signalling or QoS signalling plane.

Some signalling protocols allow end points to negotiate the parameters of a media session (flow) between them, which may result in the negotiation of multiple codecs and other media stream parameters. Typically, these signalling protocols do not require application layer notification of network entities when either end point changes to another codec within the negotiated set. When changing codecs, other parameters may change as well (e.g., packetization rate and packet size). Many networks (e.g., Data Over Cable System Interface Specification (DOCSIS)) rely on these parameters to schedule the proper QoS for the end points involved in the session. When providing QoS via a Push method (e.g., proxied QoS) and using a signalling protocol which does not require re-signalling to change the flow characteristics (e.g., codec change), it may not be feasible to rely on, for example, an Application Function to update the network with the new QoS parameters for the flow.

In some embodiments, the best place to perform QoS adjustment is in the network itself. By allowing the network to detect and change the necessary QoS reservation, neither the session signalling plane, nor the QoS signalling plane (e.g., Application Function) need be involved, and QoS changes can occur quicker, leading to reduced packet loss and delay.

There are two functions which, in some embodiments, may be executed in order for this QoS adjustment to occur: 1) detection of the insufficient QoS reservation, and 2) modification of the QoS reservation to a level which is sufficient. There are several ways in which detection may be performed with the specifics depending on the type of network being used (e.g., DOCSIS, Ethernet, or 802.11). For example, on a DOCSIS network, a CM would detect insufficient upstream QoS resources and subsequently notify a CMTS that the current level of upstream QoS is insufficient. In the downstream case, for example, the CMTS itself would detect this situation. On an Ethernet network, for example, one method would be to monitor flow bandwidth levels relative to their established QoS, and, for example, if the flow is trying to use more bandwidth than it currently has QoS reserved for, the router (e.g., a SBC) may choose to increase the QoS reservation for the flow (e.g., within some pre-authorized envelope in order to avoid theft-of-service, denial-of-service attacks, etc.).

Bandwidth is not the only attribute of a QoS reservation, as packet size and packet frequency are other examples of QoS parameters that can be monitored and may be part of a QoS reservation. In the case of a shared network with a slotted scheduler (e.g., DOCSIS) it is important to monitor those parameters as well and adjust QoS reservations for a flow in response to the observed traffic patterns (e.g., again, preferably within the limits of a pre-authorized envelope to mitigate security concerns). In general, traffic parameters which are important to QoS reservations on a particular type of network may be monitored. Once, for example, the router has determined that the current QoS reservation is insufficient (possibly by being informed by another entity, e.g. a CM), the router may increase the QoS resources within the authorized envelope. This authorized envelope specifies the ceiling (e.g., a LUB) on the QoS resources that the router may allow to be used on the flow, without actually reserving or committing those values ahead of time. This may allow for a more efficient QoS usage. Similarly, in some example embodiments, the router may detect when the current QoS reservation is too large and decrease the QoS resources accordingly. While an increase in QoS reservation may need to happen instantaneously, a decrease in QoS reservation may not happen instantaneously, but rather after the flow has been observed to consistently fall below the current QoS reservation for some time.

In some embodiments, the exact period of time may be configurable, and may depend on the application which, in turn, may be known via the Application Function interaction. Lowering the resource reservation may release some of the reserved network resources, which, in turn, implies that those resources may not be available later if needed. In some embodiments, it may be a configurable policy as to whether the network administrator's policy prefers efficiency over guaranteed resource availability. Accepting such a preference is to some degree inherent due to the fact that the initial reservation is intended to be lower than the LUB, and the network then increasing the resource reservation, if the resources are available, subsequently in response to observed application behavior. In one example embodiment, the network may allow for such a preference initially only, but once an automatic increase in network resources reservation has taken place successfully, not allow for a subsequent automatic reduction of the resource reservation.

In some example embodiments, the network may base its decision on whether to decrease the network resource reservation based on current resource availability. For example, the network may choose to automatically decrease a network resource reservation only when a certain percentage of network resources are still available. This provides a certain statistical probability that a subsequent increase in the network resource reservation will succeed. The exact details of when to decrease a network resource reservation may be left to the network administrator's policy. However, it is important that decreases are not performed immediately, since packet losses, periods of silence, variable bit-rate codecs, etc. may lead to what appears to be a need for less reserved network resources, but which nevertheless should not result in lowering the resource reservation. To further mitigate the effects of such scenarios, one example embodiment may, in addition to an authorized, reserved, and committed envelope, also use one or more Lower Bound Auto Reserved (LBAR) envelopes. A flow with an LBAR may not have its resource reservation set to anything lower than the LBAR, and furthermore, in an example embodiment, adjusting the resource reservation to the LBAR may only be done if the observed flow characteristics match that of the LBAR. In some embodiments, there may be more than one LBAR provided to allow for a multitude of media stream configurations that would result in automatically lowering the resource reservation to the lowest LBAR value that would still accommodate the observed flow characteristics.

FIG. 1 is a diagram of an example system 100 illustrating a system in steady state wherein resource reservations are made. A network 101 is operatively coupled to a CMTS 102 via a network interface 103. This CMTS 102 is operatively coupled to a CM 104 via a second network interface 105 wherein this interface is a DOCSIS network interface. A CM 104 is operatively coupled to an end point 106 via a third network interface 107. This end point 106 may be a network device, computer system, television, or other device. The CM 104 transmits an Unsolicited Grant Service (UGS) packet which includes an Unsolicited Grant Service Header (UGSH) which contains a number of sub-element header fields. These sub-element header fields include an extended header (EH) EH_type, EH_length, and an EH_value header field. The EH_value header field contains a further Active Grants sub-header field. This Active Grant sub-header field, and the value contained therein, is set to binary value 1, or some other suitable value. This UGS packet may be transmitted from the CM 104 to the CMTS 102 via network 105. The transmission of this UGS packet with UGSH 108 uses resources of a previously established reservation. This reservation will be authorized by means of a call management or policy server 109 that is operatively coupled to the CMTS 102. This QoS reservation will be less than or equal to a previously authorized LUB. Graph 110 depicts the number of upstream bits over time where an existing QoS reservation 111 is set that has a bound that is less than or equal to a LUB 112. Further, a downstream graph 113 representing bits over time. This downstream graph 113 describes an existing QoS reservation 114 that is less than or equal to a LUB 115. In some cases, the values reflected by 112 and 115 are the same, whereas in other examples the values reflected by 112 and 115 are different. Further, in some cases, the values reflected by 111 and 114 are the same whereas in other examples the values reflected by 111 and 114 are different.

In some embodiments, a CM, which the end point is behind, detects that the packets being classified for the Unsolicited Grant Service (UGS) service flow no longer fit in the grants being offered for this service flow. Some example embodiments may include the CM detecting this either by the packets simply being too large to fit in the UGS grant size, or, in the case where the packetization rate has changed, packets coming into a buffer residing on the CM may constantly outpace/underpace the rate in which they are removed from the buffer.

In some example embodiments, where the packets classified for the service flow no longer fit the grants, then in the next UGS packet sent, the CM asserts (e.g., sets to 1) bit 7 of the Active Grants bit header field of the UGSH, which indicates to the CMTS that more resources are needed. In still other embodiments, another bit of the Active Grants bit header field is asserted so as to serve as a flag denoting the need for a change in the QoS. The payload of the packet used to set the pertinent bit in the Active Grants header field in the UGSH may be irrelevant if the original media packet does not fit in the current UGS grant size (this is due to the fact that DOCSIS specifies that the oversized original media packet must either be placed on the primary best effort service flow or dropped entirely). Upon receipt of the asserted bit 7 in the UGSH, the CMTS may increase the grant size and/or grant frequency of the UGS to the maximum allowed by the authorized envelope (e.g., the LUB), if the bandwidth is available. In other embodiments, a new Extended Header field (e.g., EH) is created and used in a DOCSIS Request Media Access Control (MAC) Message for the Real Time Polling Service, Non-Real Time Polling Service, and Best Effort service flow scheduling types. Similar to the Active Grants field in the UGSH, the Extended Header field may have a one bit flag which may be asserted when the CM detects more traffic is arriving than the current reservation can sustain. This flag informs the CMTS that more resources for the media flow are required.

Figure 2:
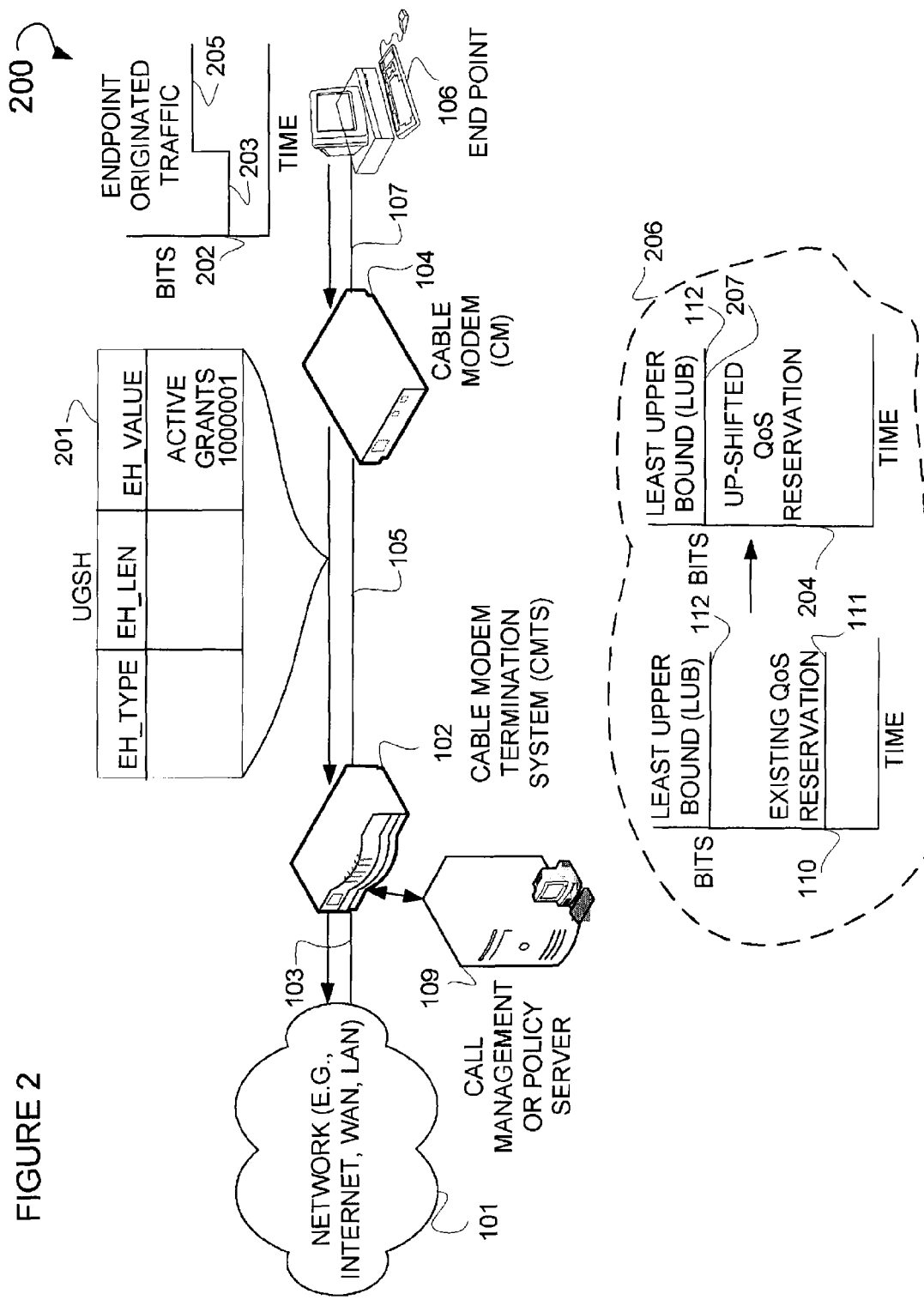
FIG. 2 is a diagram illustrating an upstream case for an example system where more network resources are required.

FIG. 2 is a diagram illustrating an upstream case for an example system 200 where more network resources are required. Illustrated is an end point 106 operatively coupled to a CM 104 via network 107 which is stimulated by the increase of traffic originating from this end point 106. Further, illustrated is a graph 202 of bits over time originated from end point 106 wherein a steady state traffic rate 203 is increased to a new traffic rate 205. A CM 104 signifies or flags the existence of increased traffic flow and the need for a new upshifted QoS reservation via flagging a bit in a data header field of a packet. This packet is a UGS packet which includes a UGSH 201 with the seven-bit position of an active grants header field flagged. The flag may be one or the flag may be zero. In some example embodiments, graphs 110 and 204, collectively referenced as 206, reflect an upshift in QoS reservation that is required to accommodate the increased traffic flow 205. In some cases, the QoS reservation is upshifted from an existing reservation 111 to a new reservation bound 207. This new reservation bound may be less than or equal to the LUB 112.

Example Case: Downstream Cases

In some embodiments, a CMTS detects that the packets being received and classified as belonging to the downstream service flow no longer fit within the QoS resources allocated for that flow. Moreover, since the downstream device does not use a slotted scheduler, a simple change in reception rate may not necessarily require QoS changes. However, if the overall bandwidth requirements for the flow do change, additional QoS resources may have to be reserved by the CMTS. In response to detecting this change in the downstream traffic, the CMTS increases the QoS resources reserved to the maximum allowed by the authorized envelope (e.g., the LUB). This process of increasing the QoS resources reserved is known as upshifting or up-speeding. Further, the CMTS sends a Dynamic Service Change Request (DSC-REQ) to the CM to inform the CM of the updated QoS reservation.

Figure 3:
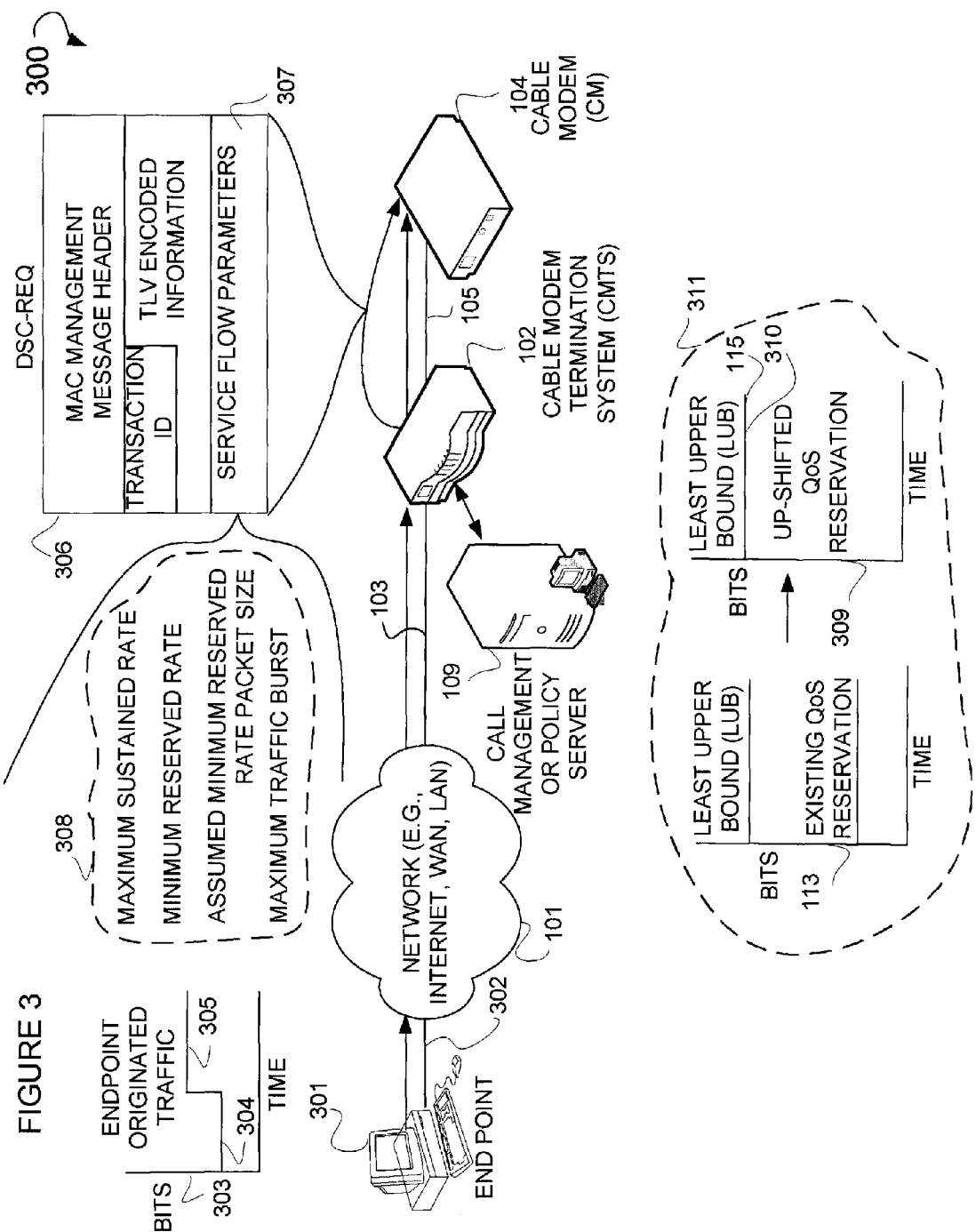
FIG. 3 is a diagram illustrating an example system in a downstream case where more network resources are required.

FIG. 3 is a diagram illustrating an example system 300 for a downstream case where more network resources are required. In some example embodiments, an end point 301 is operatively coupled to a network 101 via a network interface 302. The end point 301 may be stimulated such that there is an increase in traffic flow. A graph 303 of bits over time describes an increase in traffic flow from a steady state rate 304 to a new rate 305. Illustrated is a CMTS 102 operatively coupled to a CM 104 via network interface 105 which sends a DSC-REQ 306 packet to the CM 104 notifying it of an increase in the QoS reservation for the downstream traffic emanating from end point 301. In some embodiments, a DOCSIS-style network, and its associated packets such as the DSC-REQ 306 packet are used, whereas, in other embodiments, other types of networks and associated packets can be used including, for example an Evolution-Data Optimized (EVDO) network, Worldwide Interoperability for Microwave Access (WiMAX) network, or other type of suitable network. In some embodiments, an implementation may be used such that a time slotted scheduler is operated by one or more devices (e.g., a router) to manage network traffic and changes in QoS reservations based on incoming traffic behavior. Illustrated is a series of service flow parameters contained in a service flow header field 307. Contained in this service flow header field 307 are a number of parameters including, for example, a maximum sustained rate value, minimum reserved rate value, an assumed minimum reserved rate packet size, and a maximum traffic burst value. Collectively, these are referenced as 308. These various values change when there is a change in an existing QoS reservation value. For example, using the G729 codec the following values may be used:

Assumed Minimum Reserved Rate Packet Size: 68
Minimum Reserved Rate: 54400
Maximum Sustained Rate: 54400
while after an upshift to PCMU, the following values may be used:
Assumed Minimum Reserved Rate Packet Size: 218
Minimum Reserved Rate: 87200
Maximum Sustained Rate: 87200

The maximum burst value may remain constant, or, in some cases, change. In some embodiments, other suitable parameters may be used and modified to inform a network device of the requirements for a specific upshift, or in some cases, downshift of traffic. In yet other embodiments (see discussion below relating to networks utilizing a SBC), there will not actually be any explicit parameters to inform the network device of the change in network resource reservation but rather, the router will simply adjust its local resource reservation for the flow on the link in accordance with the observed increase in network resources.

Example Case: Steady State Using DOCSIS & Session Initiation Protocol (SIP)

In some embodiments, media streams are sent across a network utilizing a variety of protocols. For example, a Session Initiation Protocol (SIP), in combination with a Session Description Protocol (SDP), is implemented to set up a media stream session. Some example embodiments may include the use of a plurality of codecs during the course of this session. Some example embodiments may include the following codecs: PCMU, G723, PCMA, G722, G728, G729, H263, or some other suitable codec. A SDP message contained in the body of a SIP message will define one or more codecs to be used during a session. In some example embodiments, once the session is established, media data (e.g., voice and/or video) in the form of packets will be sent across a network using, for example, the Real-Time Transport Protocol (RTP) (See e.g., Request for Comments (RFC) 3550). These packets will ride on top of some other protocol such as UDP and IP or some other suitable protocol. Contained in these RTP packets are a number of header fields, including a "Payload Type" header field denoting the particular codec used to encode the data carried by the packet. Payload type values are in the range of 0-127. Payload type values in the range of 0-95 are considered "static" in that the corresponding codec (in the absence of signalling to the contrary) is well-defined. Static payload types are summarized in various guidelines set out by the Internet Assigned Numbers Authority. For example, the PCMU codec has a payload type value of 0, G723 a value of 4, PCMA a value of 8, G722 a value of 9, G728 a value of 15, G729 a value of 18, and H263 a value of 34. Payload type values in the range of 96-127 are considered "dynamic". The mapping between a dynamic payload type and the corresponding codec must be signalled. For example, an SDP rtpmap attribute is used to map payload type 96 to PCMU (e.g., a=rtpmap: 96 PCMU/8000).

In some embodiments, the Application (e.g., a Call Management Server) or a Policy Server that interfaces to the CMTS authorizes the LUB for a particular flow based on what it has learned from an application layer signaling message. Some example embodiments may include the use of a SIP message, and the codecs signaled therein, to determine the authorized LUB. In one embodiment, the end points involved in the flow perform resource reservation and once such reservations are made a steady state exists wherein packets of a given size are sent at a constant and consistent rate with the currently implemented QoS reservation. In other embodiments, the end points involved in the flow perform resource reservation and once such reservations are made a steady state exists wherein packets of a variable size are sent at a variable rate with the currently implemented QoS reservation. Moreover, in one embodiment employing SIP, a transmission (e.g., a VoIP call) would be at a steady state, using a codec which requires fewer resources (e.g., either smaller grant size or less frequent packetization rate) than other codecs in the negotiated list.

Figure 4:
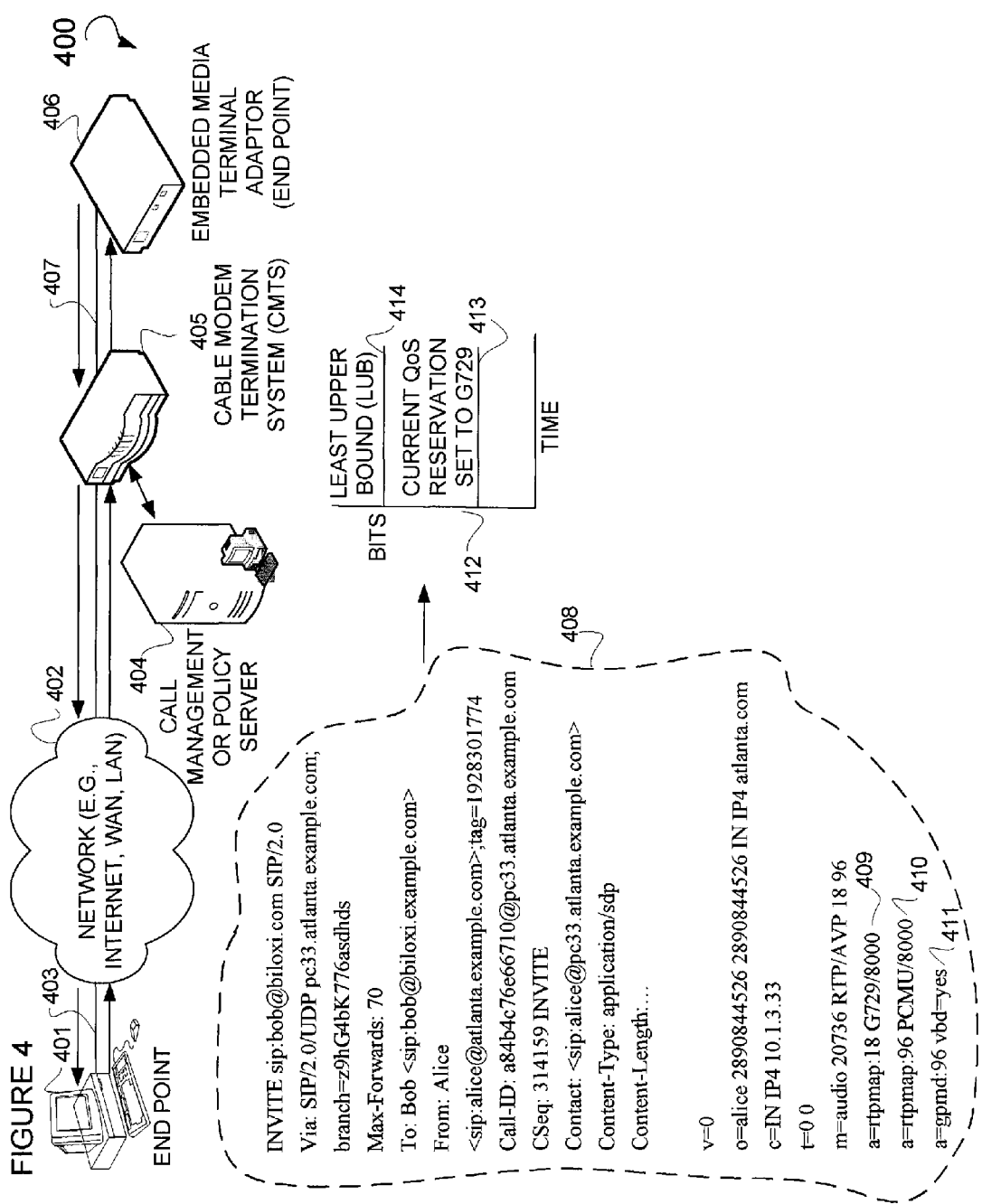
FIG. 4 is an example system diagram 400 illustrating the steady state of a network utilizing a Session Initiation Protocol (SIP).

FIG. 4 is an example system diagram 400 illustrating the steady state of a network utilizing SIP, which, in turn, utilizes SDP to denote the multiple codecs to be used within the context of a general DOCSIS-style network. In some example embodiments, an end point 401 is operatively coupled to a network 402 via network 403. This network 403 can be a DOCSIS network, a Wide Area network, a Local Area network, an Internet, a CSMA-CD network, or some other suitable network. A call management or policy server 404 may control and monitor the CMTS 405. Moreover, an Embedded Media Terminal Adaptor (EMTA) 406 is operatively coupled to the CMTS 405 via network 407. In some example embodiments, this EMTA 406 serves as an end point. Some example embodiments may include a SIP message which, in turn, contains a SDP message as a body, both referenced herein collectively as 408. In some example embodiments, an SDP message may contain a codec attribute field 409 which here is set to the G729 codec and it may contain an additional codec header field 410 which is set here to PCMU. Other codecs may be used including: G723, G728, or some other suitable codec as is known in the art. Also illustrated is a General-Purpose Media Descriptor (GPMD) header field 411 indicating whether Voice Band Data (VBD) will be available with this SIP session (here the answer is "yes") and, if so, what the RTP payload classification for this VBD will be (here it will be "96"). In some example embodiments, a graph 412 depicting bits over time describes the setting of a current QoS reservation to G729, depicted herein via reference 413. In some example embodiments, a LUB 414 is set. Still, in some example embodiments, this LUB and QoS reservation value are set by the call management or policy server 404 and further enforced by the CMTS 405.

Example Case: Upstream & Downstream Modification Using DOCSIS & SIP

In one example embodiment, an end point is an EMTA, and hence can perform DOCSIS signaling. Other possible embodiments may, however, exist (e.g., a CableHome enabled CM which can act on Universal Plug and Play (UPnP) QoS messages). As described above, where there is a pending upshift in network traffic, then in the next UGS packet sent, the EMTA asserts bit 7 of the Active Grants bit header field of the UGSH, which indicates to the CMTS that more bandwidth is needed. In other embodiments, a new EH field is created and used in a DOCSIS Request MAC Message for the Real Time Polling Service, Non-Real Time Polling Service, and Best Effort service flow scheduling types. Similar to the Active Grants field in the UGSH, the Extended Header field may have a one bit flag which may be asserted when the CM detects more traffic is arriving than the current reservation can sustain. This flag informs the CMTS that more resources for the media flow are required. In parallel with setting bit 7, the EMTA may send a DSC-REQ to the CMTS with the actual required bandwidth (this is the traditional way for the EMTA to require more bandwidth), which may be less than or the same as the authorized envelope (e.g., the LUB). Some example embodiments may include a case where the outcome of this DSC-REQ signaling may serve as the official request/response to the up-speed success or failure. In order to avoid a race condition between the receipt of the DSC-REQ and an asserted bit 7 in the USGH, the CM must not send UGSHs with an asserted bit 7 after sending the initial DSC-REQ until another situation arises which requires a bandwidth increase. Moreover, upon receipt of the asserted bit 7 in the UGSH, the CMTS may increase the grant size and/or grant frequency of the UGS to the maximum allowed by the authorized envelope, if the bandwidth is available. Some embodiments may include a presumption that this happens faster than waiting for the DSC 3-way transaction to complete, thus providing the endpoint with the reservation increase sooner. Additionally, once the EMTA notices that the UGS grant size and/or frequency has changed, it can immediately start sending the updated flow on the modified service flow. This change may happen either as a result of the asserted bit 7 or the DSC-REQ. If the grant size and/or frequency does not change, then the EMTA can presume that the CMTS does not have enough bandwidth to allow the updated flow to proceed.

In some embodiments, waiting for a response to the novel upshift request may not cause any more problems than without this optimization. This is due to the fact that without the optimization, for all DOCSIS embodiments, all packets for the updated flow would either be dropped or transferred via the primary best effort service flow since they did not fit the grant size/interval. In example embodiments, the determination between being dropped or sent via best effort is based on the setting of the request transmission policy for the service flow.

Figure 5:
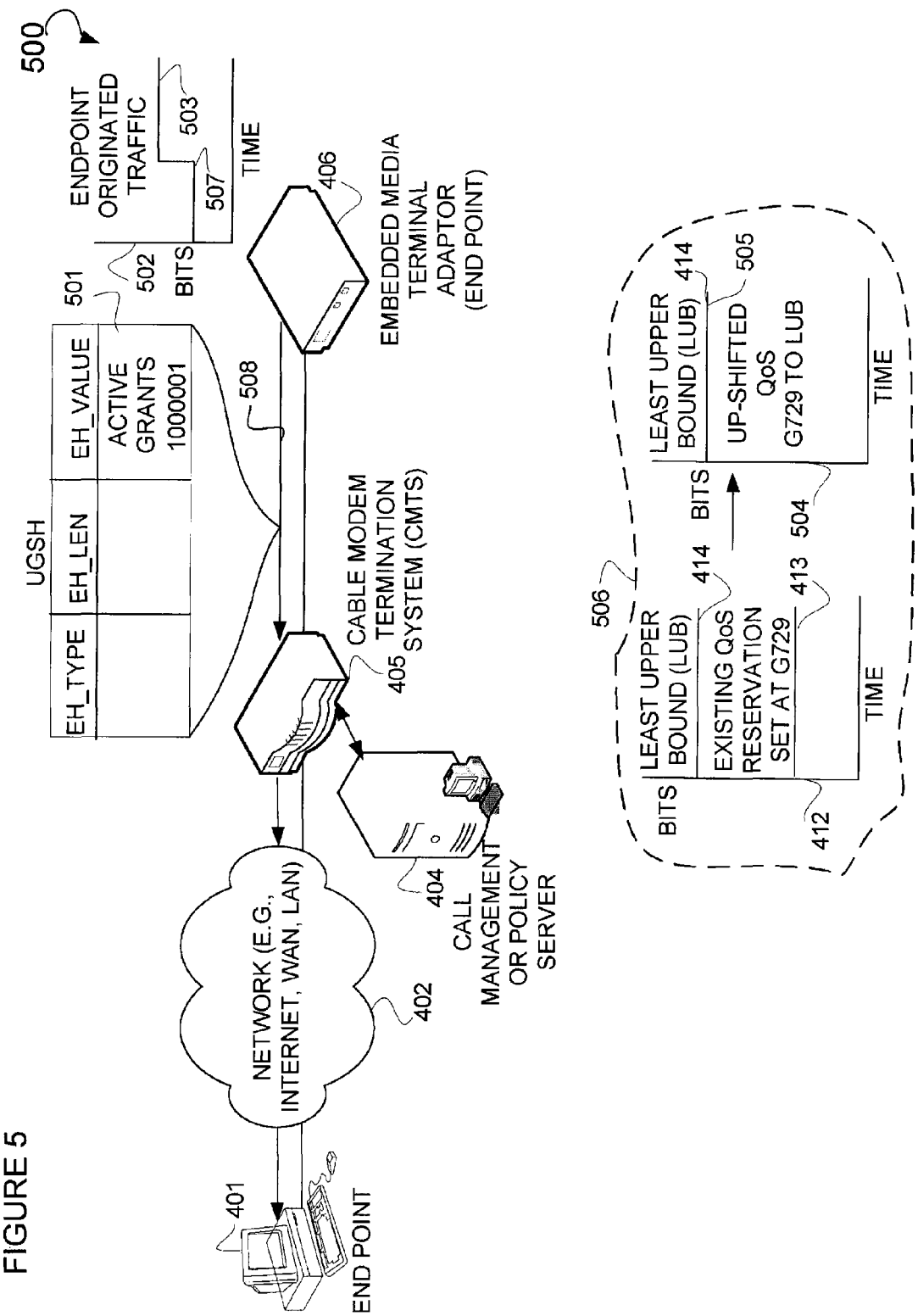
FIG. 5 is a diagram illustrating an example system where there is an upstream increase in bandwidth traffic, packet size or packet frequency emanating from an Embedded Media Terminal Adaptor (EMTA).

FIG. 5 is a diagram illustrating an example system 500 where there is an upstream increase in bandwidth traffic or packet size emanating from an EMTA 406. Some example embodiments may include a graph 502 of bits over time reflecting this increase in traffic emanating from the EMTA 406. This increase is reflected in the change from the steady state rate 507 to a new rate 503. In some example embodiments, a UGS packet and UGSH related subheader fields 501 is described that discloses an active grants header field with an asserted bit 7 position, wherein the binary value is 1000001. This UGS packet may be a part of a media stream 508 flowing between EMTA 406 and CMTS 405. In some example embodiments, once the EMTA 406 is stimulated to increase its use of bandwidth, or is stimulated to increase the bandwidth by sending larger packets while maintaining the same rate or sending the same size packets more frequently, a corresponding upshift in QoS reservation needs to occur. In some example embodiments, a graph 412 of bits over time depicts a steady state, wherein an existing QoS reservation set to G729 as referenced herein as 413, is set to be less than or equal to some LUB 414. In some example embodiments, once network traffic emanating from EMTA 406 is increased, then a corresponding upshift in the QoS reservation occurs (e.g. to accommodate an upshift to PCMU). The upshift in reservation occurs and is reflected in graph 504 of bits over time wherein the upshifted value 505 mirrors or closely tracks the LUB 414. Collectively, this upshifting in QoS reservations is reflected as 506 herein.

Figure 6:
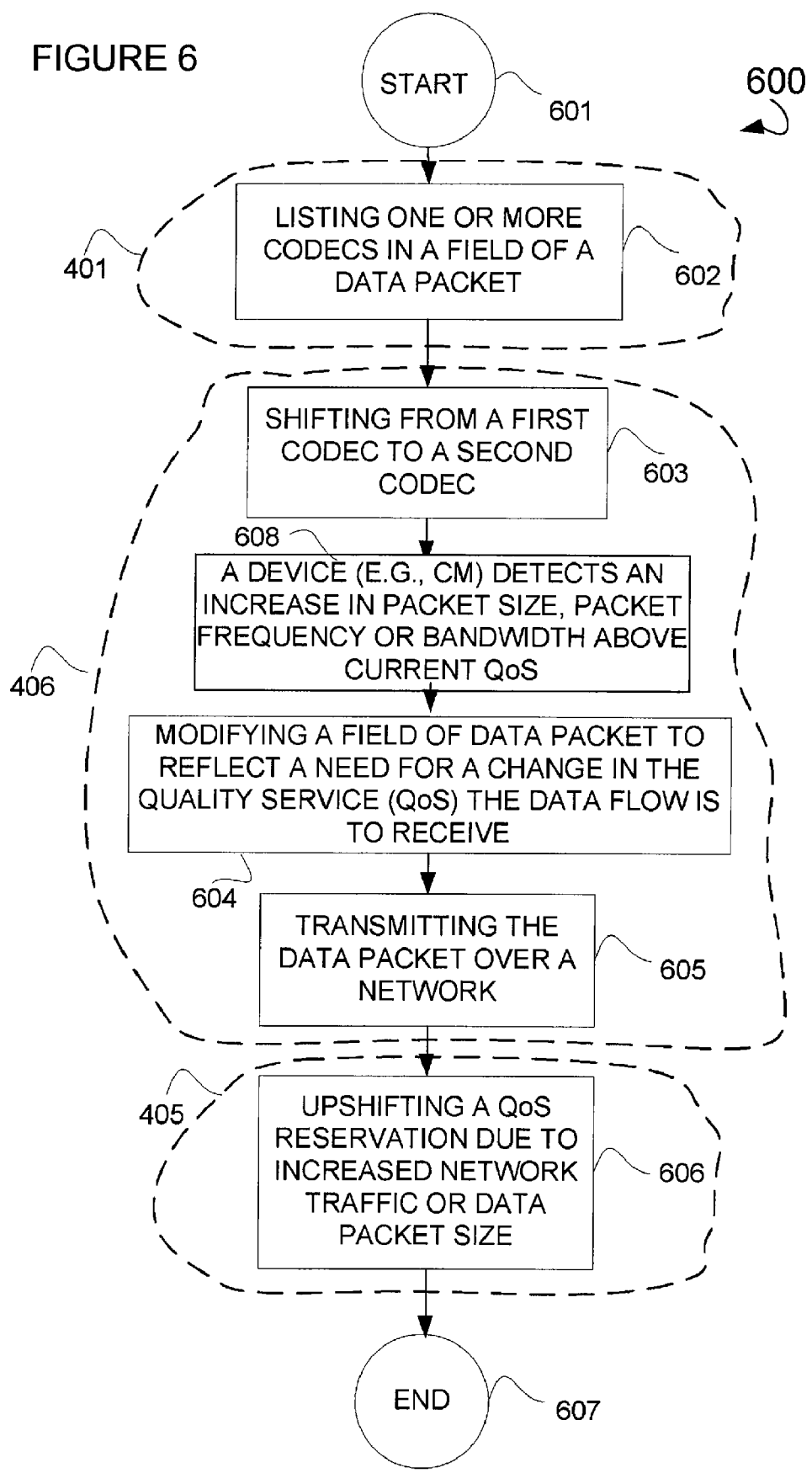
FIG. 6 is a flow chart describing an example method to change a QoS reservation.

FIG. 6 is a flow chart describing an example method 600 to change a QoS reservation. In some embodiments, a module 601 is initiated whereby a module 602 allows for the listing of one or more codecs in the field of a data packet. As described above, this codec may be listed as a part of an SDP message, and may be sent by, for example an endpoint 401. Next, where an endpoint (e.g., 406) is stimulated to shift from one codec to another, a shifting from a first codec to a second codec occurs as reflected in module 603. In some cases, this shift will be from a lower bandwidth (e.g., G729) codec to a higher bandwidth codec (e.g., PCMU). Next, a module 608, may detect a change in packet size, packet frequency or bandwidth. Based upon this detected change, a modification of data packets may occur to reflect this increase of traffic and to inform other devices on the network of the need for a change in the QoS that a data flow is to receive. Module 604 reflects this modification which may be carried out by, for example, a CM 104 or EMTA 406. This data packet may be, for example, a UGSH packet 201. A module 605 may be implemented that allows for the transmitting of this packet over a network. This packet may be, for example, transmitted by a CM 104, or EMTA 406. In some embodiments, the network may be a DOCSIS, or some other suitable network. Module 606 reflects the actual upshifting of a QoS reservation due to increased network traffic, data packet size, or data packet frequency. This upshifting may be performed by, for example, a CMTS 102 or 405, and the upshift will be to a value less than or equal to the LUB set by, for example, a call management or policy server 109 or 404. Module 607 marks the end of the example flow chart 600. Some embodiments may include module 602 being implemented using an endpoint 401, modules 603-605 and 608 being implemented using an endpoint 406, and the module 606 being implemented using a CMTS 405. In some embodiments, the method described herein may be implemented in one or more object-oriented programming languages such as, for example, JAVA™, C, C++, DELPHI™, C#™, or other suitable programming language.

Figure 7:
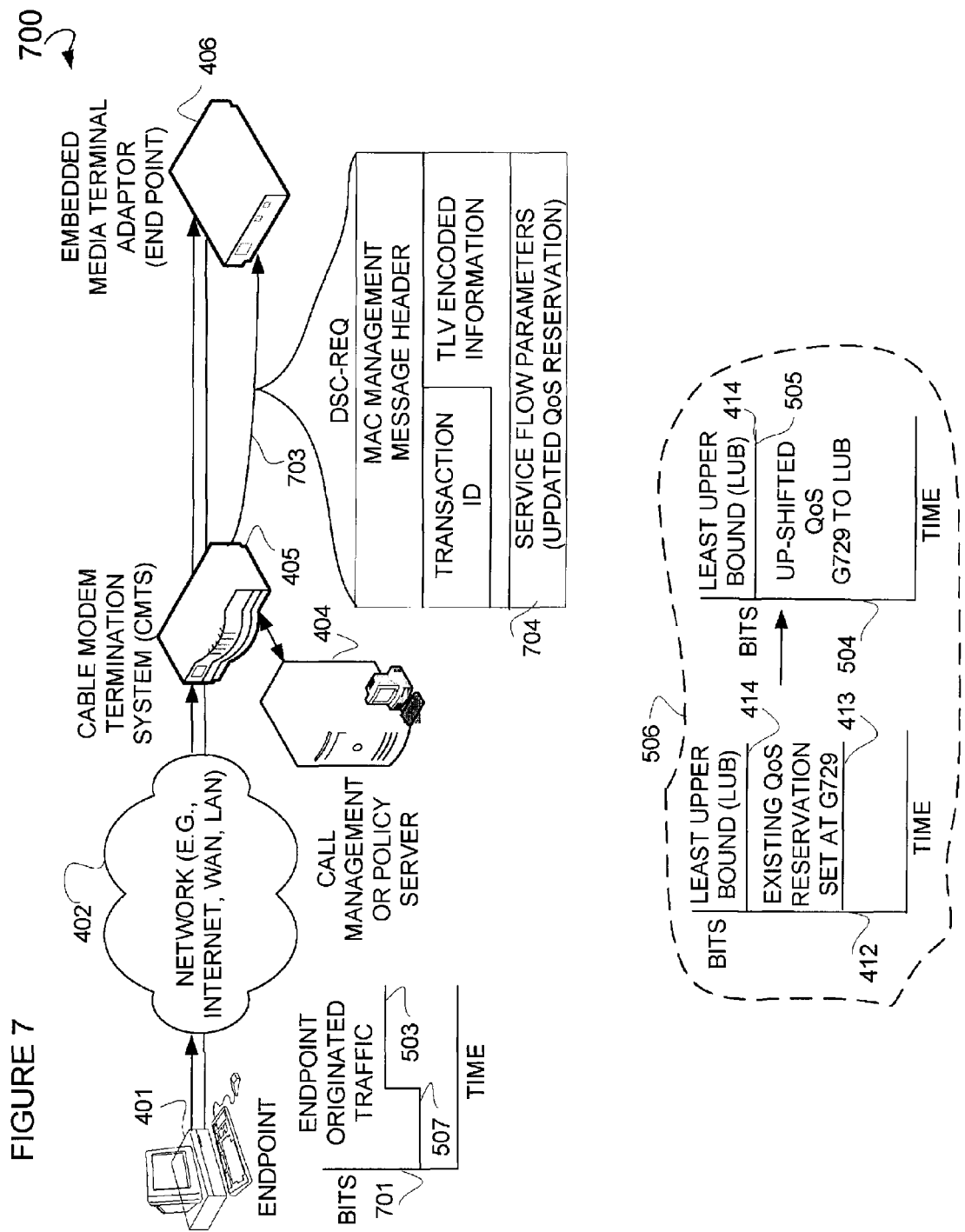
FIG. 7 is a diagram illustrating an example system with a downstream increase in bandwidth traffic, packet size or packet frequency emanating from an end point.

FIG. 7 is a diagram illustrating an example system 700 with a downstream increase in bandwidth from an end point 401. Some example embodiments include a graph 701 of bits over time illustrating the stimulation of an end point 401 wherein there is an increase in network traffic due to actual increase in bandwidth usage. Described in the graph 701 is a steady state rate 507 that is in some embodiments increased to a new rate 503 to reflect the additional network traffic. In some example embodiments, a DSC-REQ message is sent to an EMTA 406 from a CMTS 405. This DSC-REQ message 703 contains updated QoS reservation information 704. This updated QoS reservation information may instruct the EMTA 406 of the forthcoming increase in network traffic.

Figure 8:
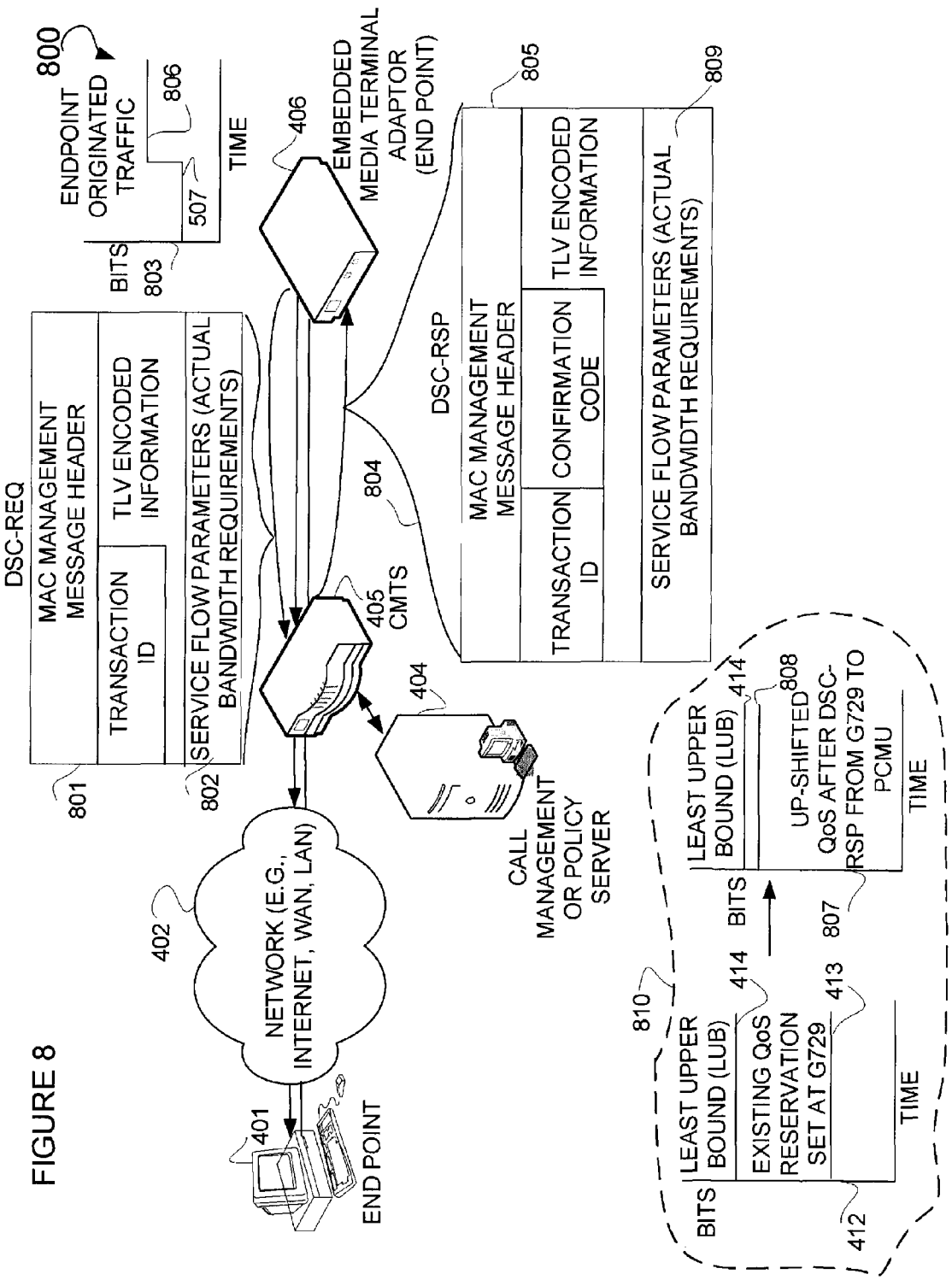
FIG. 8 is a diagram illustrating an example system where there is an upstream notification of an increase in bandwidth traffic through a Dynamic Service Change-Request (DSC-REQ) message, and the acknowledgment of this increase in traffic via a Dynamic Service Change-Response (DSC-RSP) message.

FIG. 8 is a diagram illustrating an example system 800 where there is an upstream notification of an increase in bandwidth traffic through a DSC-REQ message, and the acknowledgment of this increase in traffic via a DSC-RSP message (e.g., a dynamic service change-response message). In some embodiments, this may happen in parallel with the asserted bit 7 of the Active Grants header field, as show in FIG. 5. In some example embodiments, an EMTA 406 is stimulated to utilize additional bandwidth. This may occur where, for example, the codec used in a SIP session initiated to provide Voice over IP service (VoIP) needs to be changed to reflect a new service to be provided during the session. This new service could be, for example, the transmission of VBD associated with data modems, facsimile terminals and text telephones. In such an example, the codec may have to change from G729 to, for example, PCMU. Such a change in codecs would require an up-shift to accommodate the new bandwidth associated with the new codec. The previously described GPMD header field 411 denotes the possibility of a change, and informs the receiving network device or computer system of this possibility. Graph 803 of bits over time illustrates an up shift from an old steady state 507 to a new steady state 806 reflecting an increase in bandwidth traffic. Illustrated is a DSC-REQ message 801 sent from the EMTA 406 to the CMTS 405 notifying it of an increase in the bandwidth and the need for an upshift in QoS reservation. A service flow parameters header field 802 will contain the actual new bandwidth requirements for the increased traffic flow. A DSC-RSP message 805 from the CMTS 405 may inform an EMTA 406 that a QoS reservation has been upshifted. Service flow parameter field 809 contains parameters relating to the upshifting of a reserved rate 413 to an upshifted rate 808. An upshift can occur to reflect not only increased bandwidth usage due to the actual sending of more packets or the size of the packets (e.g., the increase in packet size), but also there can be an upshift do to a change in codec as previously described. Graph 412 of bits over time illustrates an existing QoS Reservation set to G729, referenced herein as 413, which is a value of less than or equal to a LUB 414. Once an EMTA 406 sends a DSC-REQ message to a CMTS 405 notifying it of a change in codec, an upshift of QoS reservation may occur, reflected herein as 808, such that the QoS reservation is upshifted to accommodate the new codec, which in this case is the PCMU codec. Collectively the two graphs 412 and 807 are referenced as 810.

Example Case: Upstream & Reservation Downgrade

Figure 9:
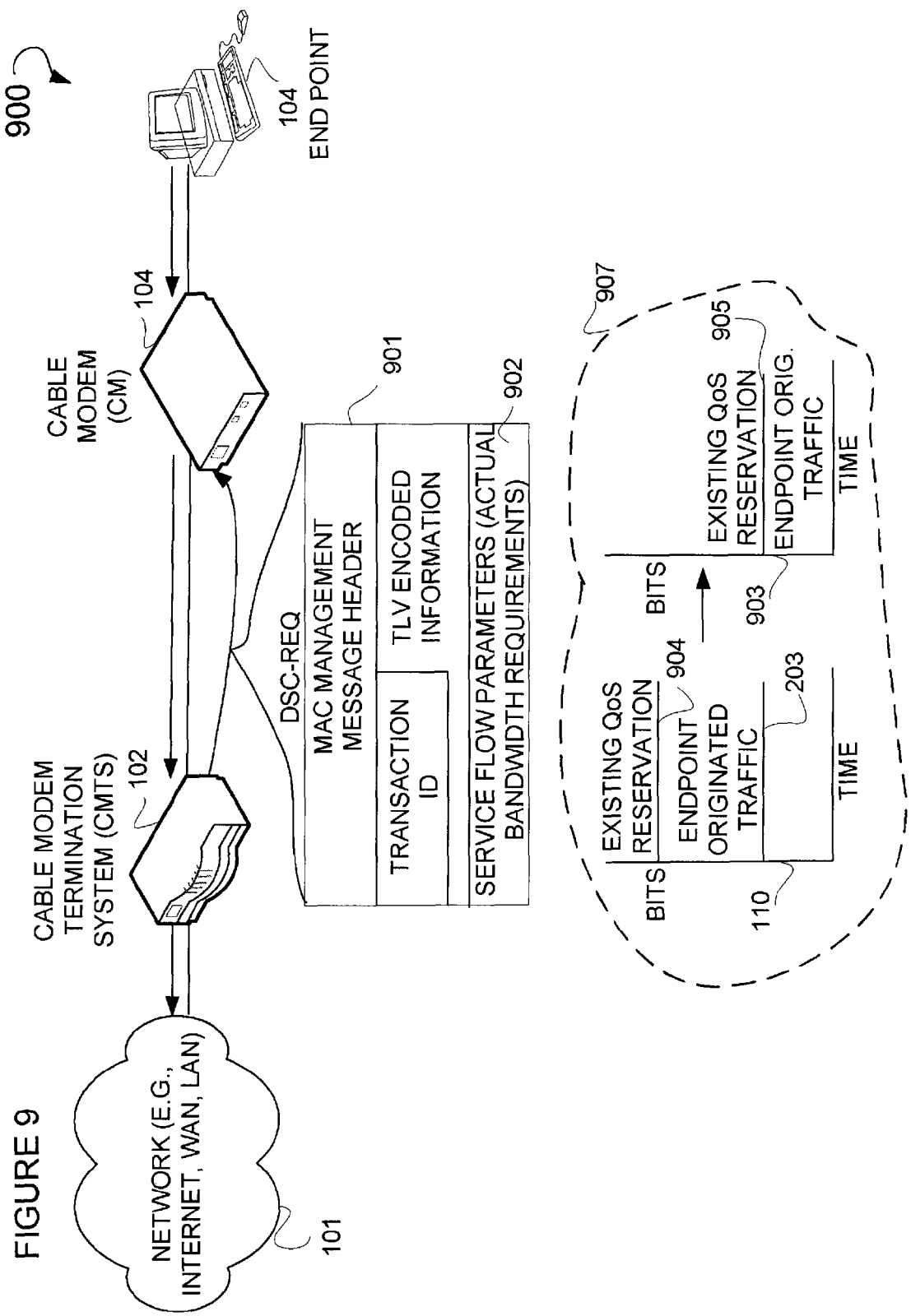
FIG. 9 is an example system diagram illustrating the decrease of bandwidth traffic resulting in a corresponding downshifting of the existing QoS reservation.

FIG. 9 is an example system diagram 900 illustrating the decrease of bandwidth traffic resulting in a corresponding downshifting of the existing QoS reservation. Illustrated in this figure is a DSC-REQ message 901 with a service flow parameter header field 902 that contains the parameters relating to the downshifting of a reserved rate 904 to a reserved rate 905 (the reserved rate 905 may equal the current endpoint originated traffic rate). The downshifting should only occur when the observed traffic has consistently used less than the currently reserved bandwidth over some period of time and the network administrators policy furthermore allows for downshifting of resource reservations. This packet may be sent from, for example, a CMTS 102 to a CM 104. Graph 903 depicts this downshifting where an existing QoS reserved rate 905 is downshifted to be equal to the endpoint originated traffic rate. Collectively graph 903 and the graph 110, illustrating the pre-existing QoS, are referenced as 907. Such a down shifting may occur where, for example, there is a change from a high bandwidth codec to a lower bandwidth codec (e.g., changing from PCMU to G728) which is not signaled via the signaling nor QoS control planes.

Figure 10:
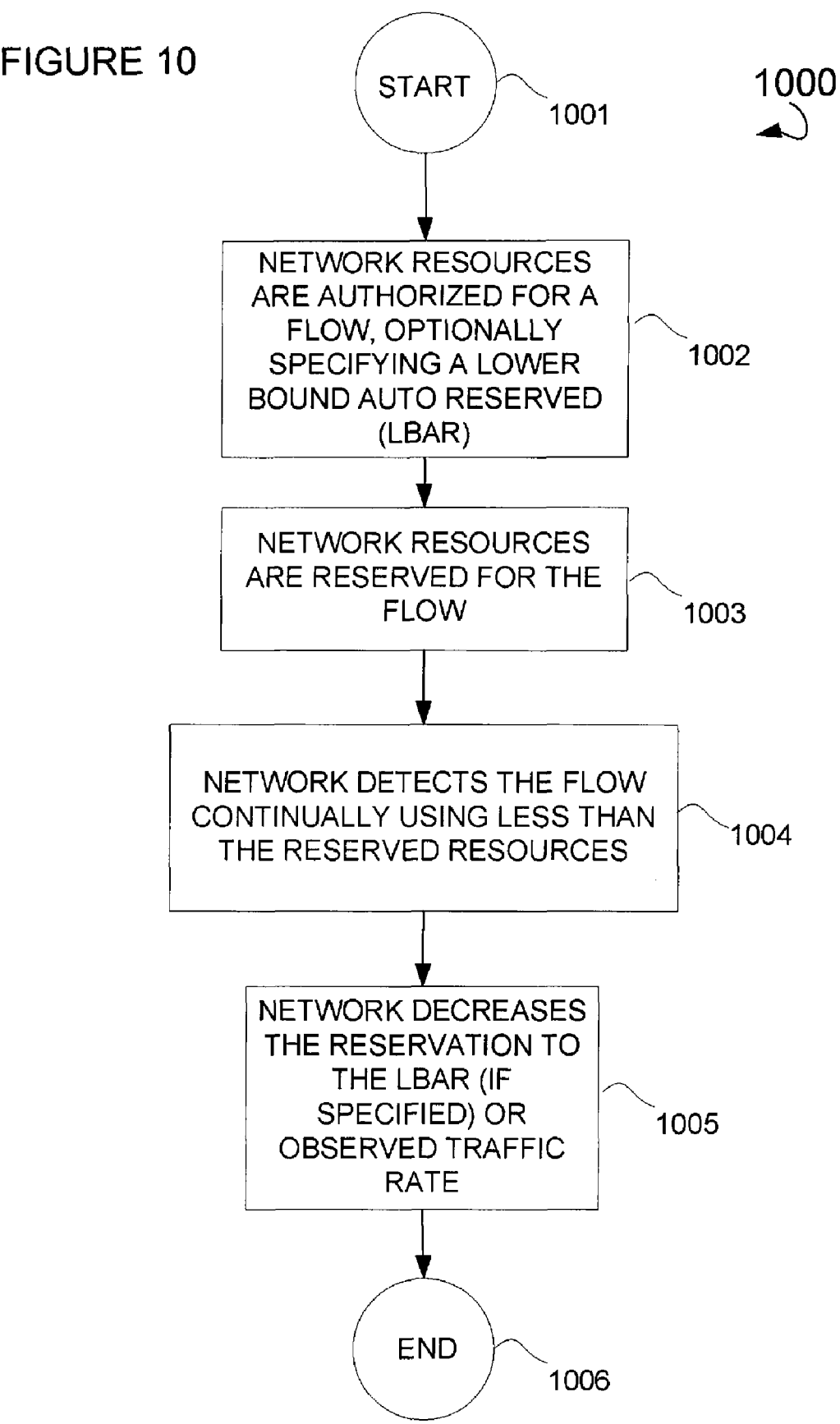
FIG. 10 is a flow chart illustrating an example method, wherein network resources are reduced for a flow.

FIG. 10 is a flow chart illustrating an example method 1000. In some embodiments, a module 1002 is initiated with a start 1001, wherein network resources are authorized for a bandwidth flow or data flow. A LBAR value or values may be authorized by this module 1002. Based upon this bandwidth or data flow, certain network resources are reserved for the flow via the execution of a module 1003. Next, in certain cases, a network will detect via a module 1004 the bandwidth or data flow falling below a predetermined reserve rate for this particular bandwidth or data flow. In some embodiments, the module 1004 may detect that less than the reserved resources are being used. In response to this falling rate or under utilization, a module 1005 will decrease a reservation to one of the predefined LBAR values, or, in some cases, the observed traffic rate (e.g., the rate to which the bandwidth or data flow has decreased to). Module 1006 marks the end of the example flow chart 1000. Some example embodiments may include the methods 1004 and 1005 being implemented by a CMTS 102 or 404, or some other suitable device. In some embodiments, the method described herein may be implemented in one or more object-oriented programming languages such as, for example, JAVA™, C, C++, DELPHI™, C#™, or other suitable programming language.

Example Case: Using Session Border Controllers (SBC) & Internet Protocols

Figure 11:
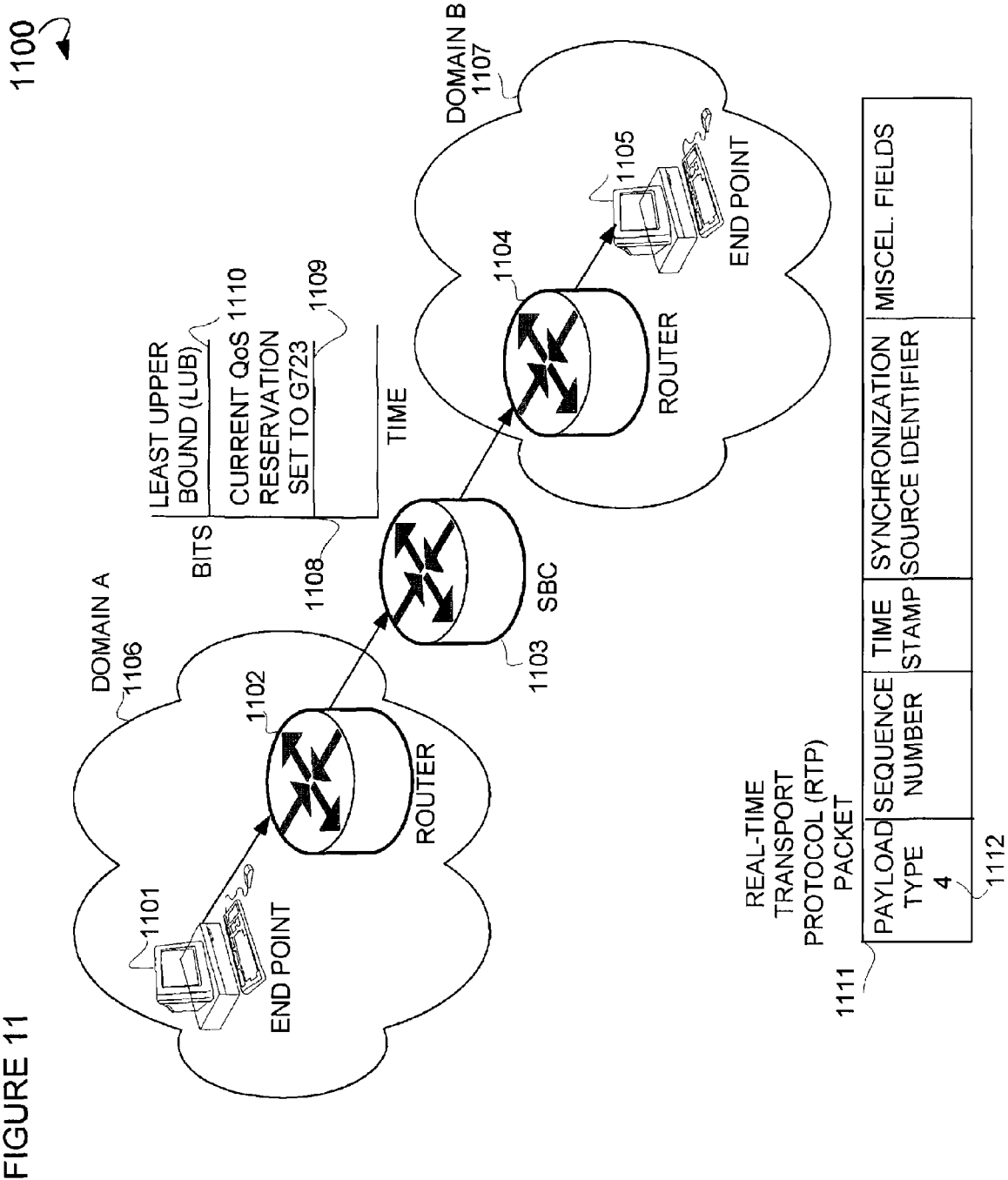
FIG. 11 is a diagram of an example system illustrating an embodiment implemented using a Session Border Controller (SBC).

FIG. 11 is a diagram of an example system 1100 illustrating an embodiment implemented using a SBC. A SBC 1103 will typically monitor the signaling channel between endpoints, 1101 and 1105. In some embodiments, routers 1102 and 1104 will be implemented as edge routers for a domain A 1106 and a domain B 1107 respectively.

Policing is a component of QoS used to limit bandwidth utilization. An SBC may limit bandwidth utilization (e.g., police) based on a provisioned aggregate session limit. In some embodiments, the provisioned maximum bandwidth utilization may correspond to the network capacity. The network capacity may reflect the capacity of access links between subscribers and providers, transit links between providers, etc. The network capacity may reflect the capacity of the SBC itself. Moreover, in some embodiments, the provisioned aggregate session limit may reflect a Service Level Agreement (SLA) between two peering service providers.

In admitting a new session (or re-admitting an existing session), a SBC may attempt to reserve bandwidth corresponding to the LUB of the negotiated codec list. If the aggregate reserved session bandwidth is less than the provisioned bandwidth limit, the session may be admitted (or re-admitted). Once a session is admitted, this bandwidth is reserved for the duration of the session unless the codec list is re-negotiated (e.g., SIP re-INVITE) and the session is successfully re-admitted. This reserved bandwidth is not available to create new sessions, regardless of whether it is actually being used.

If the bandwidth used is less than the bandwidth reserved, the network capacity may not be fully utilized. In some embodiments, bandwidth less than the LUB of the negotiated codec list may be reserved, freeing up the unused bandwidth to create new sessions. In some cases, the phrase "QoS reservation" in this context is used to refer to the bandwidth reserved corresponding to a particular session and, in turn, the aggregate session bandwidth.

In some embodiments, the initial QoS reservation may be based on a first codec. With embodiments involving SDP, this would correspond to the first payload type (and the corresponding codec) in the media description. In the following example, payload type 18 (e.g., G729) is the first codec, m=audio 20736 RTP/AVP 18 4 0
a=rtpmap: 18 G729/8000
a=rtpmap: 4 G723/8000
a=rtpmap: 0 PCMU/8000

In some cases, the initial QoS reservation may be based on the codec requiring the least bandwidth. In the example above, payload type 4 (G723) involves the least bandwidth. Graph 1108 depicts the number of bits over time where an initial QoS reservation 1109 for the G723 codec is set that has a bound that is less than or equal to a LUB 1110. Also illustrated is an RTP packet 1111 with a payload type field 1112 containing a value of 4 representing the G723 codec.

In some embodiments, the initial QoS reservation may exclude certain codecs. For example, as with the cable modem embodiments, the SBC may recognize PCMU as a VBD codec (e.g., based on the presence of the GPMD-SDP attribute) and recognizing that only a small percentage of calls will involve VBD, may opt not to include PCMU in the initial QoS reservation. A SBC may rely on a local (possibly provisioned) guaranteed minimum QoS to determine the initial QoS reservation.

In some embodiments, the SBC may increase the reservation corresponding to a particular session (and consequently the aggregate of all sessions) with an observed increase in bandwidth usage.

In some embodiments, the SBC may increase the QoS reservation based on an observed increase in bandwidth usage. An upshift can occur to reflect increased bandwidth usage due to an increase in the number of packets sent or the size of the packets sent, or both. In some embodiments, increased bandwidth may be detected without explicitly detecting a codec change.

In some embodiments, the SBC may increase the QoS reservation based on the explicit detection of a codec change. The codec change is detected by monitoring the payload type field in the RTP packet. In some embodiments, the SBC may calculate the bandwidth corresponding to the new payload type and increase the QoS reservation accordingly. In some embodiments, the SBC may simply increase the QoS reservation to the authorized QoS (e.g., the LUB) upon detecting a codec change.

Figure 12:
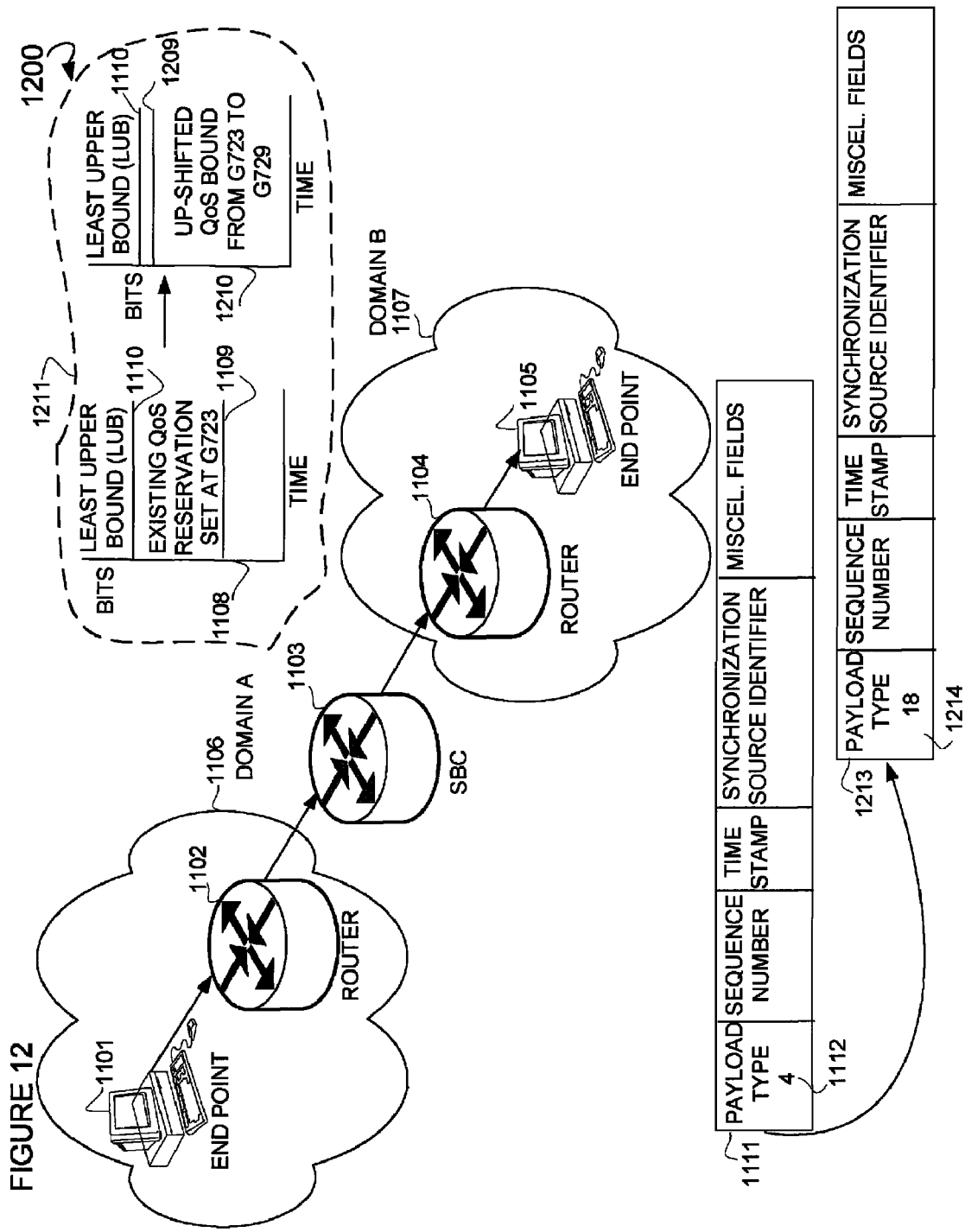
FIG. 12 is a diagram illustrating an example system describing the upshifting of a QoS reservation from the G723 codec to G729.

FIG. 12 is a diagram illustrating an example system 1200 describing the upshifting of a QoS reservation from the G723 codec to G729. Graph 1108 of bits over time illustrates an existing QoS reservation set to G723, referenced herein as 1109, which is a value of less than or equal to a LUB 1110. Once a SBC 1103 detects a change in codec (e.g, by noticing a change in the RTP Payload Type, as described above), an upshift of QoS reservation may occur, reflected herein as 1209, such that the QoS reservation is upshifted to accommodate the new codec, which in this case is the G729 codec. This upshifting is less than the LUB 1110. Collectively these two graphs (i.e., 1108 and 1210), are referenced as 1211. This upshifting is further reflected in the transition from RTP packet 1111 and the G723 codec (e.g., payload type 4) as reflected in 1112 to RTP packet 1213 reflecting the new G729 codec (e.g., payload type 18) in the field 1214.

Figure 13:
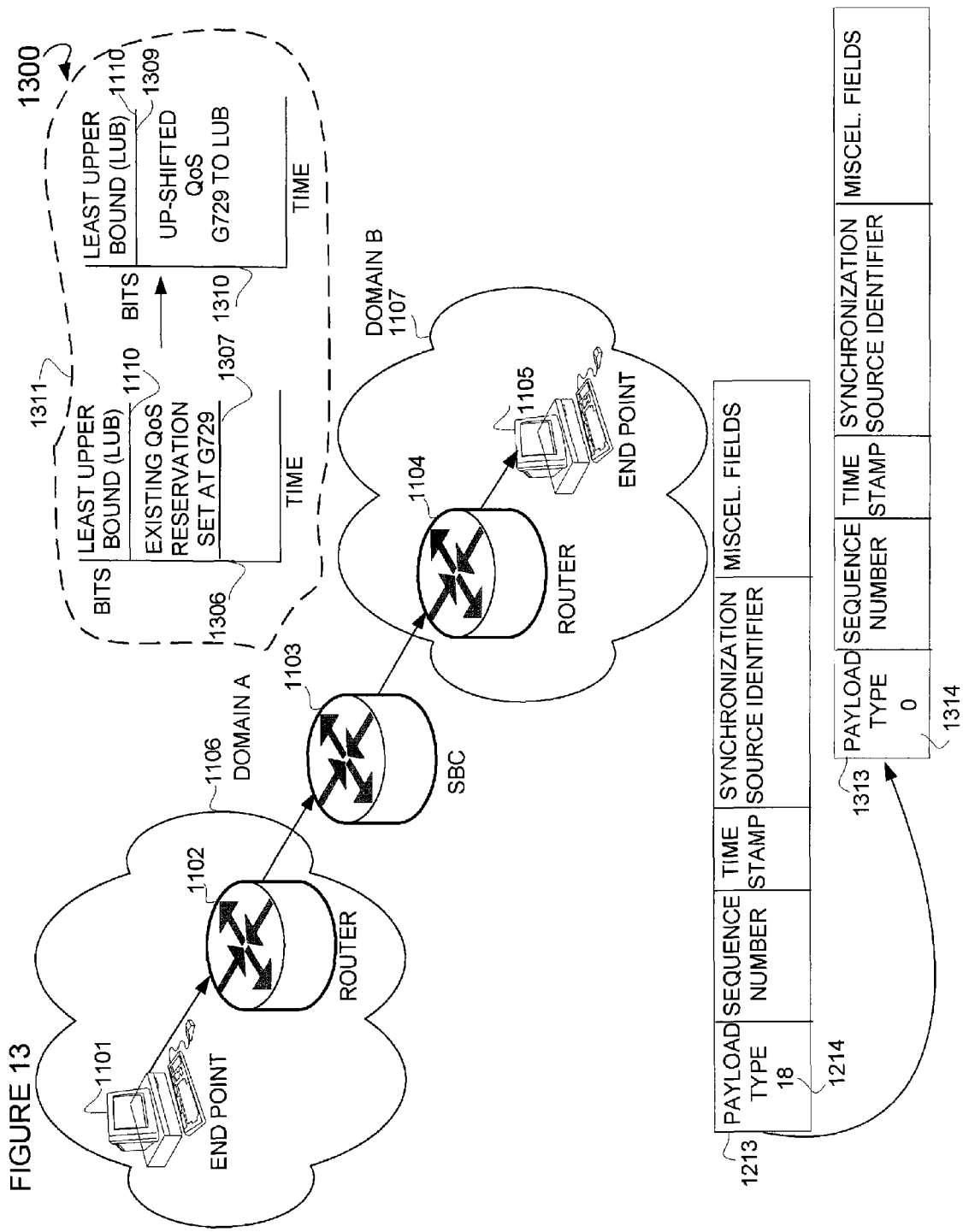
FIG. 13 is a diagram illustrating an example system describing the upshifting from a G729 codec to the LUB.

FIG. 13 is a diagram illustrating an example system 1300 describing the upshifting from a G729 codec to the LUB. Graph 1306 of bits over time illustrates the current QoS reservation set to G729, referenced herein as 1307, which is a value of less than or equal to a LUB 1110. Once an SBC 1103 detects an increase in the bandwidth usage (without necessarily detecting a RTP Payload Type change), an upshift of QoS reservation will occur, reflected herein as 1309, such that the QoS reservation is upshifted to the LUB 1110. Here, different than FIG. 12, the QoS is upshifted to be equal to the LUB. Collectively these two graphs (i.e., 1306 and 1310), are referenced as 1311. This upshifting is further reflected in the transition from RTP packet 1311 and the G729 codec (e.g., payload type 18) as reflected in 1213 to RTP packet 1313 reflecting the new PCMU codec (e.g., payload type 0) in the field 1314.

As described elsewhere, a QoS reservation may be upshifted or downshifted based upon a SBC reading a header field of a data packet (e.g., an RTP packet). Further, a QoS reservation may be upshifted or downshifted based upon an increase or decrease in packet size or bandwidth traffic.

EXAMPLE IMPLEMENTATION

Figure 14:
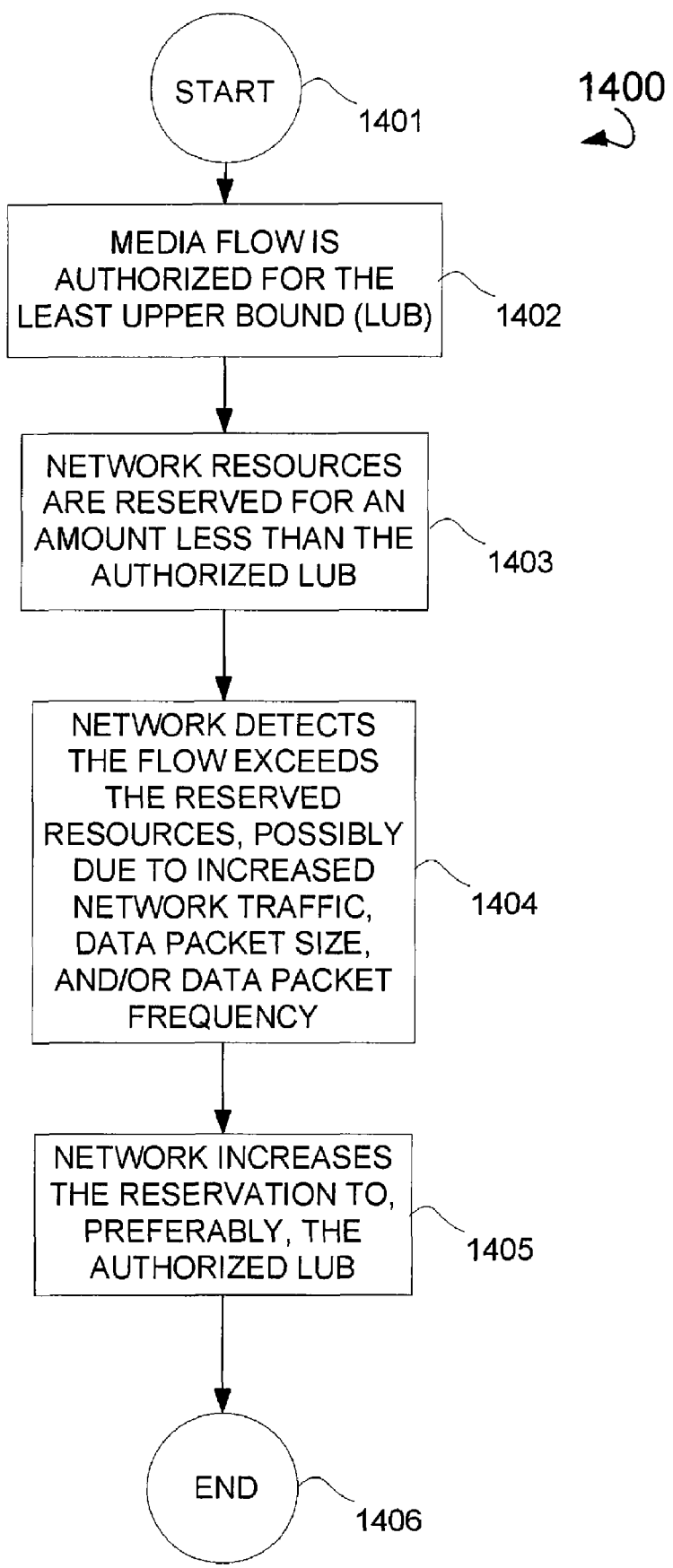
FIG. 14 is a flow chart describing an example method to change a QoS reservation based upon an increase in a media flow.

FIG. 14 is a flow chart describing an example method 1400 to change a QoS reservation based upon an increase in a media flow. Illustrated is a start 1401. This start 1401 may be, for example, in the form of an external stimulus to an end point. In some cases, a module 1402 is executed wherein a media flow is authorized for a LUB. Next, network resources maybe reserved for an amount less than the LUB, as described by module 1403. This reservation may be made by a network administrator via a device such as a call management or policy server (e.g., 109, 404). In some cases, a module 1404 may detect a flow (e.g., a media flow) that exceeds the reserved resource due to, for example, an increase in data packet size and/or data packet frequency. In some case, a module 1405 may be executed that increases the reservation to an authorized LUB. Module 1406 denotes the end of this method.

Figure 15:
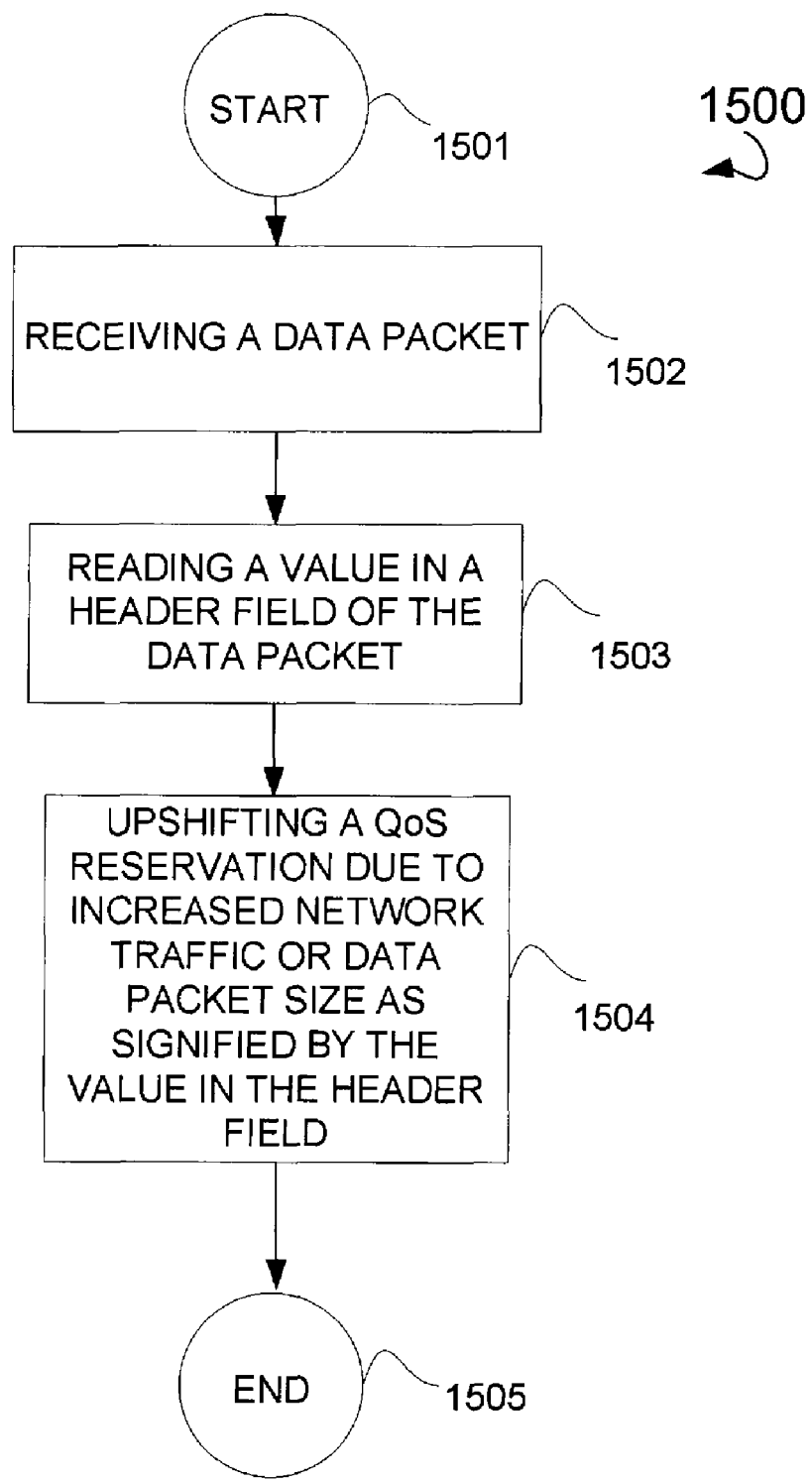
FIG. 15 is a flow chart describing an example method to change a QoS reservation.
Figure 16:
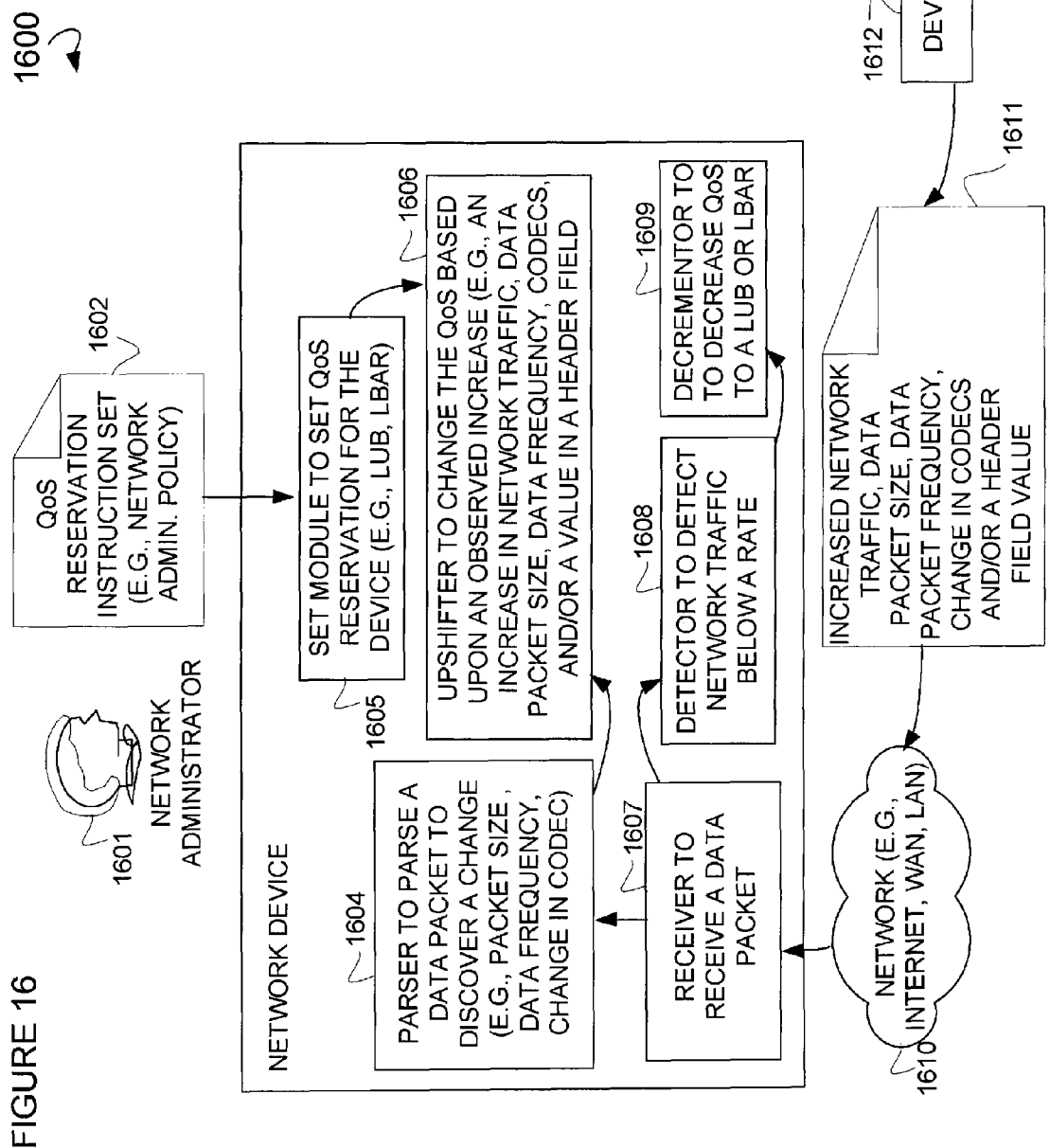
FIG. 16 is a block diagram of an example network device.

FIG. 15 is a flow chart describing an example method 1500 to change a QoS reservation. In some embodiments, a device such as a CMTS 405, SBC 1103, or other suitable device receives a data packet via module 1502. This module 1502 may, in some cases, parse the data packet to so as to obtain values from the header fields of a data packet. Once parsed, a module 1503 reads the header field of the data packet. In cases where a need for additional bandwidth is a result of the value in a header field of the data packet, a module 1504 will upshift the QoS reservation to meet this increased need. This upshift may be to a LUB value. Subsequent data packets will then, in some cases, receive an increased QoS based upon this increase. The end is denoted by module 1505. In some embodiments, the method described herein may be implemented in one or more object-oriented programming languages such as, for example, JAVA™, C, C++, DELPHI™, C#™, or other suitable programming language.
Description of Example Network Device FIG. 16 is a block diagram of an example network device 1600. Illustrated is a network device 1600 with a variety of modules providing functionality for the device. This network device 1600 may, for example, be a CMTS, a SBC, a CM, or some other suitable device or combination of devices thereof. Described is a network administrator 1601 who generates a QoS instruction set 1602 containing instructions as to a LUB, LBAR, authorized envelope and/or other values used to configure the network device 1600. This QoS instruction set may be a file written using an Extensible Mark Up Language (XML), or may be a flat file as is known in the art, or configured by a protocol as is known in the art. This QoS instruction set 1602 is received by a set module 1605 that parses the instruction set based upon a predefined grammar, and extracts the necessary information to be used to set, for example, a LUB, and/or LBAR, or more generally a QoS reservation. Once set, data packets and/or streams of data packets in the form of network traffic 1611 are transmitted across a network 1610 by, for example, a device 1612 to be received by the network device 1600 at a receiving module 1607. This network device 1612 may be, for example, an endpoint, CM or other type of device that resides on a network including another network device 1600. Once received by the receiving module 1607, a parser 1604 may be executed to parse the network traffic 1611 looking for certain data values contained in the header fields of the data packets contained in the network traffic 1611, and/or a detector module 1608 may be executed to detect changes in packet size, packet frequency, bandwidth received, or some other way of detecting changes in certain network metrics. In certain cases, a decrementor module 1609 may be executed to determine whether, for example, network traffic is below a certain level such as being a certain rate necessitating a decrease of a QoS reservation to the current observed traffic rate, or an optional LBAR value. Additionally, in some embodiments, a module 1606 (e.g., an upshifter) is implemented to allow for the upshifting of a QoS reservation based upon data received from, for example, the module 1604. In some case, this network device may implement the methods described in FIGS. 6, 10, and 14-15.

Figure 17:
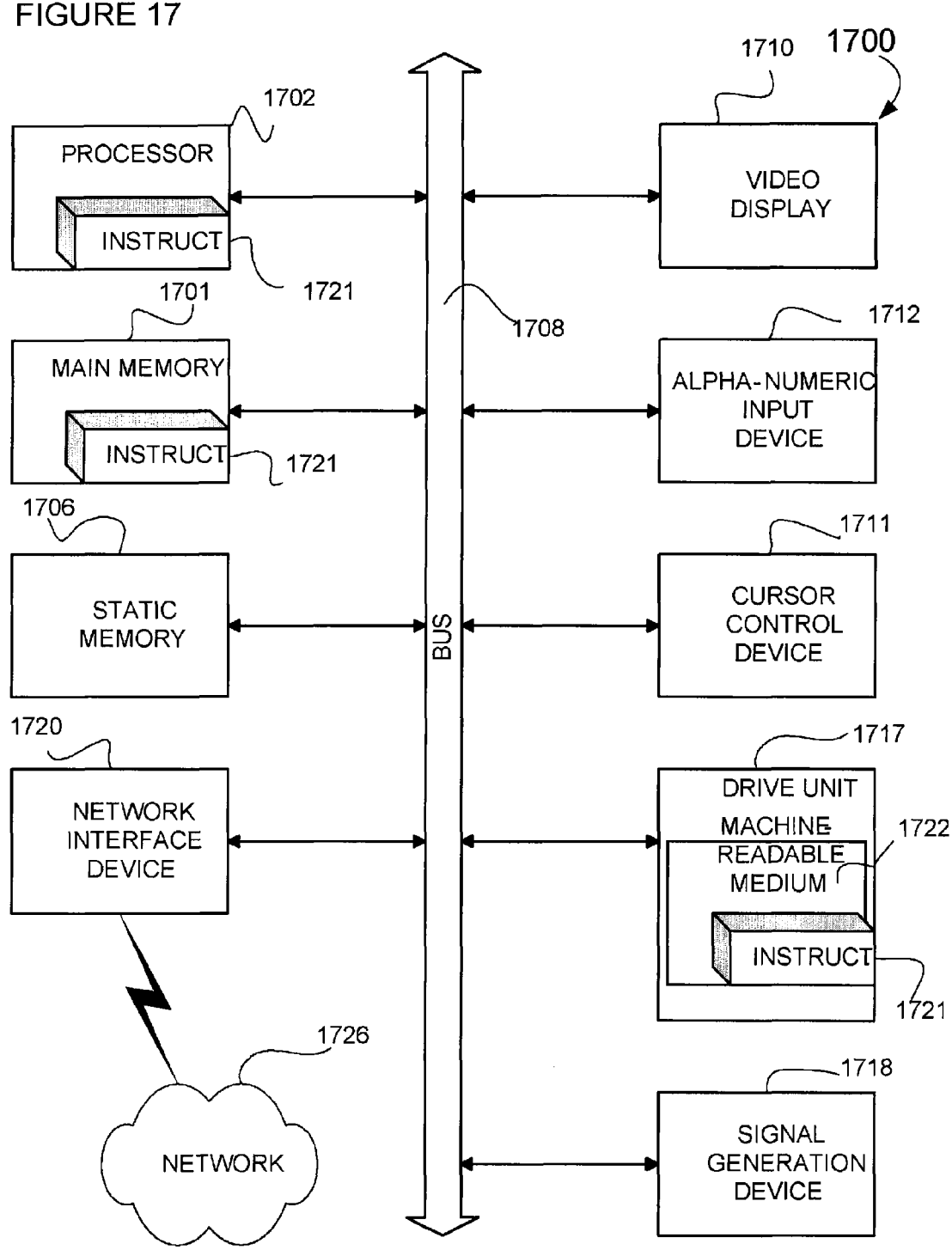
FIG. 17 shows a diagrammatic representation of a machine in the example form of a computer system.

In some embodiments, a system (e.g., systems 100-500, 800-900) utilizing these network devices is described. This system may include a first network device operatively coupled to a second network device, wherein the first network device, a CM, and the second network, a CMTS, are operatively coupled over a DOCSIS network, a detector residing on the first device that detects an observed increase, wherein an observed increase type is selected from the group consisting of an observed increase in network traffic, data packet size, and data packet frequency, a modifier residing on the first network device to modify a value contained in a header field of a data packet to identify a need for a change in a QoS reservation, a transmitter residing on the first network device to transmit the data packet over the DOCSIS network, a receiver residing on the second network device to receive the data packet, and a parser residing on the second network device to parse the data packet to obtain the value contained in the header field of the data packet, and a upshifter residing on the second network device to receive a parsed value and to upshift the QoS reservation based upon the obtained value.
Description of Example Computer System FIG. 17 shows a diagrammatic representation of a machine in the example form of a computer system 1700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections)

through a network, both perform tasks. In a distributed system environment, program modules may be located in both local and remote memory-storage devices (see below).

The example computer system 1700 includes a processor 1702 (e.g., a central processing unit (CPU), a graphics processing unit (GPU) or both), a main memory 1701 and a static memory 1706, which communicate with each other via a bus 1708. The computer system 1700 may further include a video display unit 1710 (e.g., a Liquid Crystal Display (LCD) or a Cathode Ray Tube (CRT)). The computer system 1700 also includes an alphanumeric input device 1712 (e.g., a keyboard), a user interface (UI) cursor controller 1711 (e.g., a mouse), a disk drive unit 1717, a signal generation device 1718 (e.g., a speaker) and a network interface device 1720 (e.g., a transmitter).

The disk drive unit 1717 includes a machine-readable medium 1722 on which is stored one or more sets of instructions and data structures (e.g., software) embodying or utilized by any one or more of the methodologies or functions described herein. The software may also reside, completely or at least partially, within the main memory 1701 and/or within the processor 1702 during execution thereof by the computer system 1700, the main memory 1701 and the processor 1702 also constituting machine-readable media.

The instructions 1721 may further be transmitted or received over a network 1726 via the network interface device 1720 utilizing any one of a number of well-known transfer protocols (e.g., HTTP, SIP).

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Some embodiments include a method comprising receiving a data packet, and upshifting a QoS reservation due to an observed increase in network traffic or data packet size. Moreover, in some embodiments, the method may include upshifting a QoS reservation due to an observed change in a value of a header packet field, wherein the QoS reservation is upshifted to be less than or equal to a LUB. Additionally, the method may further include modifying a value contained in the header field of a data packet to reflect a need for a change in the QoS the data packet is to receive, and transmitting the data packet over a network, wherein the network is a slotted network. In addition, the method may further include shifting from a first codec to a second codec, and denoting this shift through modifying the value header field of the data packet to reflect a need for a change in the QoS the data packet is to receive. The method may, in some embodiments, further include specifying one or more LBAR values, detecting a network traffic flow below a reserved rate, and decreasing a QoS reservation to a LBAR value. Moreover, the method may further include decreasing the QoS reservation to an observed traffic rate. Additionally, the method may further comprise decreasing the QoS reservation where less than the committed resources are being utilized.

Some example embodiments may include a system including a first device operatively coupled to a second device through a network connection, and a third device operatively coupled to the second device through a second network connection, wherein the second device upshifts a QoS reservation when the second device detects an increase in network traffic, data packet size and/or data packet frequency. In some embodiments, the system also includes a QoS reservation that is upshifted to be less than or equal to a LUB.

A system is illustrated as including a first device operatively coupled to a second device through a network connection, and a third device operatively coupled to the second device through a second network connection, wherein the second device upshifts a QoS reservation when the second device reads a value in a data packet header obtained from the first device and, based upon this value, provides an upshift in the QoS that the data packets are to receive. The network of this system may be selected from the group of time slotted scheduled network types including, but not limited to a Data Over Cable Interface Specification (DOCSIS) network, a Evolution-Data Optimized (EVDO), and Worldwide Interoperability for Microwave Access (WiMAX).

In some embodiments, a system may include an end point operatively coupled to a CM, a CMTS operatively coupled to the CM, and a server operatively coupled to the CMTS, wherein the CMTS reads a data packet header field, and a value contained therein, to determine a change in codecs, and whether there is a change in a codec the CMTS upshifts a existing QoS reservation associated with the endpoint sending a data packet to be equal to a LUB. Moreover, in some embodiments, the system may include the CMTS downshifting the QoS reservation to a lower reserved rate reflecting actual network traffic, while maintaining one or more LBAR envelopes.

Some example embodiments may include a system illustrating an end point operatively coupled to a first router, a second router operatively coupled to the first router, wherein the second router is a SBC, a third router operatively coupled to the second router, and a second endpoint operatively coupled to the third router, wherein the SBC reads a payload type header field of a RTP packet to determine a change in codecs, and where there is a change in the codecs, the SBC upshifts the QoS reservation (e.g., the allotment from a policed provisioned aggregate) associated with the endpoint to be less than or equal to a LUB. Further, the system may include a receiver operatively coupled to the SBC to receive data packets, and an upshifter to upshift the QoS reservation when an increase in data packet size is detected. Additionally, the system may include a receiver operatively coupled to the SBC to receive bandwidth traffic, and an upshifter to upshift the QoS reservation when an increase in bandwidth traffic is detected.

In some embodiments, an apparatus is illustrated as including means for receiving a data packet, and means for upshifting a QoS reservation due to an observed increased network traffic or data packet size.

Some embodiments may include logic encoded in one or more tangible media for execution and when executed operable to receive a data packet and upshift a QoS reservation due to an observed increased network traffic or data packet size.

Some embodiments may include a method comprising receiving a data packet at a network device, and upshifting a QoS reservation, wherein the upshifting is based upon an observed increase type selected from the group consisting of an observed increase in network traffic, data packet size, and data packet frequency. Further, the method may include upshifting a QoS reservation due to an observed change in a value of a header packet field, wherein the header packet field is selected from the group consisting of an RTP header field, and an UGSH, and the QoS reservation is upshifted to be less than or equal to a LUB. Additionally, the method may further include modifying a value contained in the header field of the data packet to identify a need for a change in the QoS reservation, and transmitting the data packet over a network, wherein the network is a slotted network. Further, the method may include reading a data packet header field to discover a shift from a first codec to a second codec, and upshifting the QoS reservation based on the discovery of the modified data packet header. Additionally, the method may include decreasing the QoS reservation to an observed traffic rate. The method may include specifying one or more LBAR values, detecting a network traffic flow below a reserved rate such that where the network traffic flow falls below the LBAR, the QoS reservation is decreased, and decreasing a QoS reservation to one or more of the LBAR values.

In some embodiments, a network device is described as including a receiver to receive data packets, and an upshifter to upshift a QoS reservation, wherein the upshifter observes an increase type selected from the group consisting of an observed increase in network traffic, data packet size, and data packet frequency, wherein the network device is selected from the group consisting of SBC, routers, and CMTS. Additionally, the network device further includes an upshifter to upshift a QoS reservation due to an observed change in a value of a header packet field, wherein the header packet field is selected from the group consisting of a RTP header field, and an UGSH, and the QoS reservation is upshifted to be less than or equal to a LUB. In some embodiments, the network device is operatively coupled to a slotted network. Further, the network device may include a second device operatively coupled to it to transmit data packets to the network device, wherein the data packets identify a shift from a first codec to a second codec, a parser to parse and discover this second codec, and an upshifter to upshift the QoS reservation based on the discovery of the second codec, wherein the QoS reservation is decreased to an observed traffic rate. Moreover, the network device may include a set module to set one or more Lower Bound Auto Reserved (LBAR) values, a detector to detect a network traffic flow below a reserved rate, and a decrementor to decrease a QoS reservation to one or more of the LBAR values, wherein the network device comprises a router or a switch.

Some example embodiments may include an apparatus including means for receiving a data packet at a network device, and means for upshifting a Quality of Service (QoS) reservation, wherein the upshifting is based upon an observed increase type selected from the group consisting of an observed increase in network traffic, data packet size, and data packet frequency.

Some embodiments may include a computer readable medium embodying instructions which, when executed on a computer, cause the computer to receive a data packet at a network device, and upshift a QoS reservation, wherein the QoS reservation is upshifted is based upon an observed increase type selected from the group consisting of an observed increase in network traffic, data packet size, and data packet frequency.

It is to be understood that the above description is intended to be illustrative, and not restrictive. Although the numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a data packet at a network device forming part of a network, the data packet forming part of a data flow emanating from an endpoint device, the network device being in communication with the endpoint to transmit the data flow; and
   upshifting, at the network device, a Quality of Service (QoS) reservation for the data flow without receiving an external trigger separate from the data flow, wherein the upshifting is based upon an observed increase type in the data flow selected from the group consisting of an observed increase in data packet size, an observed increase in network traffic, and an observed increase in data packet frequency.

2. The method of claim 1, wherein the QoS reservation is upshifted to be less than or equal to a Least Upper Bound (LUB).

3. The method of claim 2, wherein the network is a slotted network.

4. The method of claim 1, further comprising:
   modifying a value contained in the header field of the data packet to identify a need for a change in the QoS reservation; and
   transmitting the data packet over the network.

5. The method of claim 1, further comprising:
   reading a data packet header field to discover a shift from a first codec to a second codec; and
   upshifting the QoS reservation based on the discovery of the modified data packet header.

6. The method of claim 5, further comprising decreasing the QoS reservation to an observed traffic rate.

7. The method of claim 1, further comprising:
   specifying one or more Lower Bound Auto Reserved (LBAR) values;
   detecting a network traffic flow below a reserved rate such that where the network traffic flow falls below the LBAR, the QoS reservation is decreased; and
   decreasing a QoS reservation to one or more of the LBAR values.

8. The method of claim 1, further comprising upshifting a QoS reservation due to an observed change in a value of a header packet field of the data packet.

9. The method of claim 8, wherein the header packet field is selected from the group consisting of an Real Time Transport Protocol (RTP) header field, and an Unsolicited Grant Service Header (UGSH).

10. A network device comprising:
a receiver to receive a data packet forming part of a data flow emanating from an endpoint device; and
an upshifter to upshift a Quality of Service (QoS) reservation for the data flow without receiving an external trigger separate from the data flow, wherein the upshifter observes an increase type selected from the group consisting of an observed increase in data packet size, an observed increase in network traffic, and an observed increase in data packet frequency.

11. The network device of claim 10, wherein the network device is selected from the group consisting of Session Border Controllers (SBC), routers, switches, Cable Modems (CM), and Cable Modem Termination Systems (CMTS).

12. The network device of claim 10, wherein the QoS reservation is upshifted to be less than or equal to a Least Upper Bound (LUB).

13. The network device of claim 10, wherein the network device is operatively coupled to a slotted network.

14. The network device of claim 10, further comprising:
a second device operatively coupled to the network device to transmit data packets to the network device, wherein the data packets identify a shift from a first codec to a second codec;
a parser to parse and discover this second codec; and
an upshifter to upshift the QoS reservation based on the discovery of the second codec.

15. The network device of claim 10, wherein the QoS reservation is decreased to an observed traffic rate.

16. The network device of claim 10, further comprising:
a set module to set one or more Lower Bound Auto Reserved (LBAR) values;
a detector to detect a network traffic flow below a reserved rate; and
a decrementor to decrease a QoS reservation to one of the LBAR values.

17. The network device of claim 10, wherein the upshifter is configured to upshift the QoS reservation due to an observed change in a value of a header packet field of the data packet.

18. The network device of claim 17, wherein the header packet field is selected from the group consisting of an Real Time Transport Protocol (RTP) header field, and an Unsolicited Grant Service Header (UGSH).

19. A system comprising:
a first network device operatively coupled to a second network device, wherein the first network device, a Cable Modem (CM), and the second network, a Cable Modem Termination System (CMTS), are operatively coupled over a Data Over Cable System Interface Specification (DOCSIS) network, the first network device to receive a data flow emanating from an endpoint device operatively coupled to the first network device, and to transmit the data flow to the second network device;
a detector residing on the first device to detect an observed increase in the data flow, wherein an observed increase type is selected from the group consisting of an observed increase in data packet size, an observed increase in network traffic, and an observed increase in data packet frequency;
a modifier residing on the first network device to modify a value contained in a header field of a data packet forming part of the data flow, to identify a need for a change in a Quality of Service (QoS) reservation for the data flow, the modifier being configured to modify the value in response to detection of the observed increase in the data flow, without receiving an external trigger separate from the data flow;
a transmitter residing on the first network device to transmit the data packet over the DOCSIS network;
a receiver residing on the second network device to receive the data packet;
a parser residing on the second network device to parse the data packet to obtain the value contained in the header field of the data packet; and
a upshifter residing on the second network device to receive the obtained value and to upshift the QoS reservation based upon the obtained value, without receiving an external trigger separate from the data flow.

20. An apparatus comprising:
means for receiving a data packet at a network device, the data packet forming part of a data flow emanating from an endpoint device, the network device being in communication with the endpoint to transmit the data flow; and
means for upshifting, at the network device, a Quality of Service (QoS) reservation for the data flow without receiving an external trigger separate from the data flow, wherein the upshifting is based upon an observed increase type in the data flow selected from the group consisting of an observed increase in data packet size, an observed increase in network traffic, and an observed increase in data packet frequency.

21. A non-transitory computer readable medium embodying instructions which, when executed on a computer, cause the computer to:
receive a data packet at a network device, the data packet forming part of a data flow emanating from an endpoint device, the network device being in communication with the endpoint to transmit the data flow; and
upshift, at the network device, a Quality of Service (QoS) reservation for the data flow without receiving an external trigger separate from the data flow, wherein the QoS reservation is upshifted based upon an observed increase type in the data flow selected from the group consisting of an observed increase in data packet size, an observed increase in network traffic, and an observed increase in data packet frequency.

* * * * *